INVENTORS
LAWRENCE A. CESCON
HARVEY H. HOEHN

BY *Robert E. Patridge*

ATTORNEY

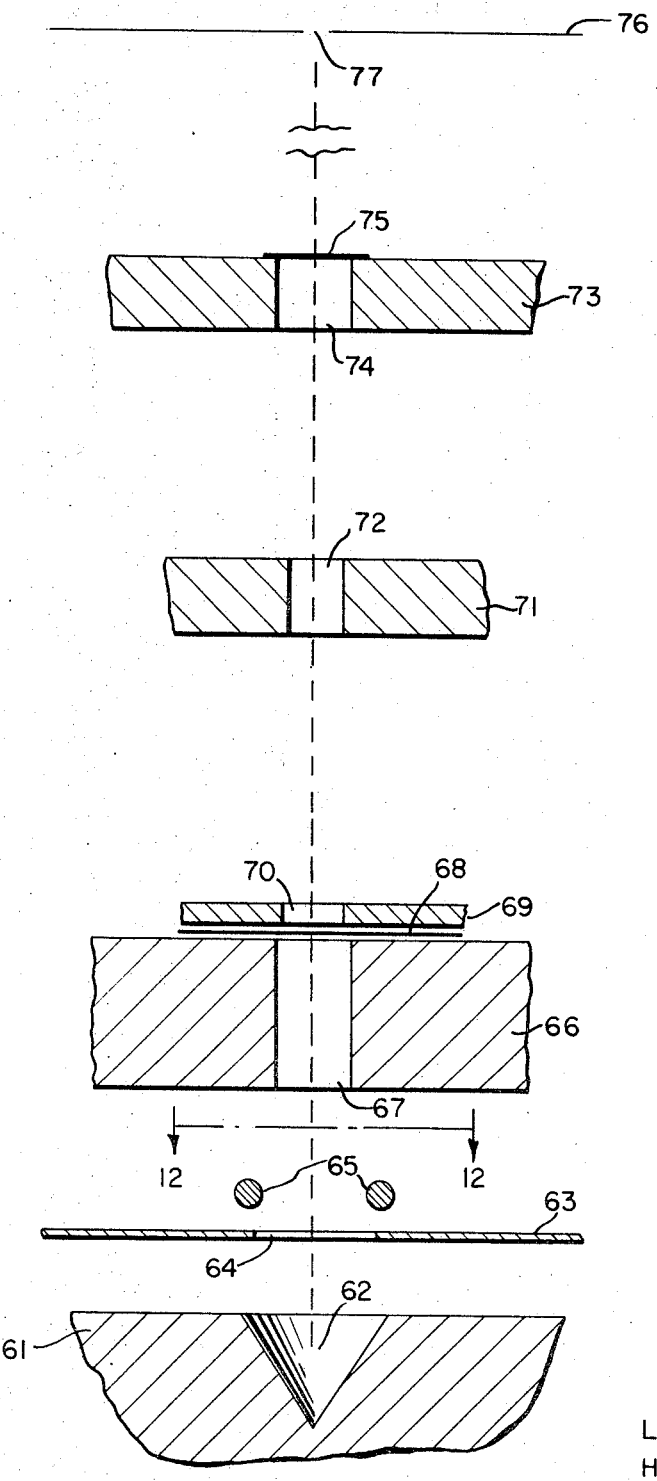
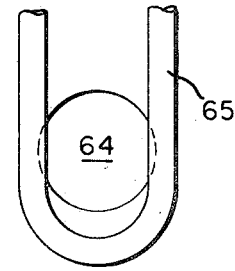
FIG. 11
FIG. 12

INVENTORS
LAWRENCE A. CESCON
HARVEY H. HOEHN

BY Robert E. Patridge

ATTORNEY

United States Patent Office 3,551,331
Patented Dec. 29, 1970

3,551,331
REVERSE OSMOSIS SEPARATIONS USING A TREATED POLYAMIDE MEMBRANE
Lawrence Anthony Cescon, Wilmington, and Harvey Herbert Hoehn, Hockessin, Del., assignors to E. I. du Pont de Nemours and Company, Wilmington, Del., a corporation of Delaware
Continuation of application Ser. No. 674,425, Oct. 11, 1967. This application Sept. 22, 1969, Ser. No. 863,745
Int. Cl. B01d 13/00
U.S. Cl. 210—23   14 Claims

ABSTRACT OF THE DISCLOSURE

Reverse osmosis separation of the components of aqueous mixtures, especially saline and brackish waters, using a treated nylon membrane characterized by a high water permeability and sulfate salt rejection obtained by treating a thin nylon membrane with a treating agent which dissolves a small amount of the membrane and otherwise changes its crystalline structure. Effective treating agents include protonic acids of suitable acid strength, specified Lewis acids, and selected lyotropic salts. The thin membrane may be a flat film or hollow fiber.

CROSS-REFERENCE TO RELATED APPLICATION

This is a continuation of U.S. application Ser. No. 674,425 filed Oct. 11, 1967, now abandoned.

BACKGROUND OF THE INVENTION (1) Field of the invention

This invention relates to the reverse osmosis separation of liquid mixtures, and particularly to the purification of saline and brackish waters using improved permeation membranes. More specifically, it relates to a reverse osmosis purification process using as the barrier a polyamide membrane which has been treated with a selected treating agent to dissolve small amounts of the membrane and to swell the membrane and otherwise change its structure thereby increasing the rate at which water passes through the membrane without greatly increasing the rate at which other components pass through. This invention also relates to polyamide hollow fiber membranes which have been treated to render them suitable for use as reverse osmosis membranes and to the method of treating polyamid membranes.

(2) Description of the prior art

The principles of reverse osmosis purification of water containing dissolved inorganic salts are well known. In such processes, water containing the dissolved salts is held under pressure against a suitable semipermeable membrane which passes water but does not pass the salt ions. If the pressure exceeds the normal osmotic pressure of the solution against the membrane, fresh water passes through the membrane, while the solution remaining behind becomes more concentrated in the salt.

The key factor in such a separation is the permeation membrane itself. It must have a characteristic selectivity for performing a useful separation, that is, pass some components of the solution to be separated, while holding back others. Furthermore, it must have sufficient mechanical strength to withstand pressure under the conditions of the separation, and it must have a sufficient fluid-passage rate to accomplish its characteristic separation in a practical period of time. It must also be formed from a material having sufficient chemical and physical stability to maintain these desirable properties for a considerable period of time under use conditions.

These desirable characteristics are affected by both the material from which the membrane is formed and the physical configuration of the membrane. Membranes developed heretofore have generally had one of two physical configurations. Probably the better known of these is the thin film form taught by Loeb and Sourirajan in U.S. Pat. 3,133,132. Suitable permeators for using these thin film membranes are taught by Michaels in P.S. Pat. 3,173,867.

The second common physical configuration of membranes comprises hollow fibers formed from a water-permeable material. Mahon, in U.S. Pat. 3,228,877, and Maxwell et al., in U.S. Pat. No. 3,339,341, issued Sept. 5, 1967, disclose the use of hollow fiber membranes in permeators for fluid separation processes These permeators may contain one or more bundles of hollow fibers, each of which may contain millions of individual fibers. Both ends of the bundle are potted or embedded in a suitable resin or other retaining material and the bundle is enclosed in a housing with various inlet and outlet means. The resulting permeator resembles a shell-an-tube heat exchanger. An aqueous mixture is passed into the shell side of the housing under pressure and purified water is obtained from the ends of the hollow fibers through the tube side of the housing. A variation of this configuration is shown by Remington et al. in British Pat. 1,019,881 in which the hollow fibers are in the form of a U-shaped bundle with all fiber ends embedded in the same resin and member. Hollow fibers serving as the basis for such membranes may themselves be prepared by solution spinning as disclosed in British Pat. 514,638 or by melt spinning as disclosed in French Pat. 990,726, in British Pats. 843,-179 and 859,814, and by Breen et al., in U.S. Pat. 2,999,-296.

Because of its low energy requirements, reverse osmosis is inherently among the more economical ways of purifying saline and brackish waters. Recent developments in the production of purified water from saline and brackish waters by reverse osmosis have emphasized the failure of past researchers to obtain commercially attractive long-lived membranes with high water permeabilities and salt rejections even though a great amount of work has been done with membranes of many different compositions. Cellulose acetate membranes are currently being recommended as the best overall materials available. However, membranes derived fro this material have relatively short useful lives.

Other materials such as polyamide resins, commonly called nylon, are known to be more durable than cellulose acetate, but do not have as good overall properties. In Research and Development Progress Report No. 61 of the Office of Saline Water, U.S. Department of Interior (April 1962), it is reported that nylon 6 does not have good water permeability when compared with cellulose acetate. In Research and Development Progress Report No. 150 of the Office of Saline Water (October 1965), Lonsdale et al. report that highly hydrophilic substituted nylons have water permeabilities nearly equal to those of cellulose acetate, but their physical strength is substantially degraded. On the other hand, nylons which are free of hydrophilic substitution have good strength properties, but their water permeabilities and salt rejections were found to be inferior to those of cellulose acetate.

SUMMARY OF THE INVENTION

We have now discovered a process for the reverse osmosis separation of a liquid mixture containing at least about 25% by weight water which comprises (A) passing said mixture in contact with one surface of a substantially linear aliphatic polyamide resin membrane which is about 2–75 microns thick and is characterized, when dry, by (1) a wide angle X-ray diffraction pattern indicating a high degree of crystallinity, the crystal perfection index being at least about 90, and (2) a small angle X-ray diffraction pattern indicating the presence of scattering centers which, when determined by the Dismore small angle soft X-ray method, have an extrapolated intercept scattering intensity at zero scattering angle of about 50–220 calculated by the method of Guinier, and is characterized, when wet, by (3) a water permeability of about 50–50,000.

(B) and recovering from the other side of the membrane liquid mixture which has passed through the membrane and which contains a reduced amount of one component of the mixture.

when the membrane is in the form of a hollow fiber, it should have an outside diameter of about 10–250 microns, a wall thickness of about 2–75 microns, and a ratio of the cross-sectional area of the internal bore of the fiber to the total cross-sectional area within the outer perimeter of the fiber of about 0.12–0.60, and be further characterized, when dry, by a wide angle X-ray diffraction pattern in which the (100) and (010, 110) diffraction arcs have orientation angles of less than about 100°.

The present invention is based upon the discovery that the rate of water permeation through a thin polyamide membrane can be materially increased without an excessive decrease in the physical strength of the membrane or its salt rejection by treating the membrane with a particular treating agent to a specified degree under controlled conditions. This process comprises (A) treating a substantially linear aliphatic polyamide resin membrane about 2–75 microns thick with a liquid treating composition containing, by weight, (1) about 1–100% of a treating agent selected from the group consisting of (a) protonic acids having a pKa in water not greater than about 10.3 and a pH not in excess of about 6.3 for a 0.01 molar aqueous solution at 25° C., (b) lyotropic salts containing a cation and an anion listed in Table II below in which the anion is higher in the list than the cation, and (c) Lewis acids selected from the group consisting of aluminum halides of the formula $AlX_3$ in which X is chlorine or bromine, and boron halides of the formula $BX'_3$ in which X' is fluorine, chlorine or bromine, and (2) about 0–99% of a solvent for said treating agent which is essentially chemically inert toward said treating agent and said membrane and is essentially a non-solvent for said membrane at a temperature at least high enough to maintain said composition as a single liquid phase but not in excess of the boiling point of said composition for at least one second, said conditions of temperature, time, concentration of treating agent and choice of solvent being such that, when said membrane is dried to constant weight, treated under said conditions rinsed to remove said treating agent and redried to constant weight, a weight loss of about 1–35% is obtained, and (B) rinsing said membrane to remove said treating agent with a rinse medium which contains at least 25% by weight water, is a solvent for said treating agent, and is essentially inert toward said membrane under the rinse conditions.

BRIEF DESCRIPTION OF THE DRAWING

FIG. 11 is a plan view in section of the X-ray apparatus developed by H. K. Herglotz used in the small angle soft X-ray method of characterizing polyamide reverse osmosis membranes developed by P. F. Dismore.

FIG. 12 is a view along line 12—12 of FIG. 11.

DETAILED DESCRIPTION OF THE INVENTION (1) Permeation properties

The rate at which water passes through a membrane is conveniently expressed in terms of water permeability. The term "water permeability," as used herein, is defined as the number of gallons of water per day which passes through one thousand square feet of membrane under the influence of an effective reverse osmosis pressure of 1000 p.s.i. It may be calculated by the equation $$\text{Water permeability} = \frac{\text{gallons of water permeate}}{\text{days} \times \text{sq. ft.} \times \text{p.s.i.}} \times 10^6$$

in which the pressure, p.s.i., is the difference in hydraulic pressure between the two surfaces of the membrane corrected for the osmotic pressure due to the difference in salt concentration of the solutions in contact with the two surfaces of the membrane.

The square feet of membrane used in the water permeability calculation is conveniently based on the surface area of flat film exposed to the feed water. In the case of hollow fibers, the surface area is the average of the areas of the inner and outer surfaces of the hollow fiber wall before treatment of the membrane as expressed by the equation:

$$\text{Sq. ft.} = \frac{\pi(D_o + D_i)L}{2}$$

in which $D_o$ is the outside diameter in feet of the hollow fiber before treatment, $D_i$ is the inside diameter in feet of the hollow fiber before treatment, and L is the length in feet of treated fiber exposed to the feed water. It has been found that the relationship between water permeability and salt rejection is independent of the thickness of the membranes treated as taught herein.

The rate at which salt is rejected by reverse osmosis membranes is conveniently expressed in terms of salt rejection. The term "salt rejection," as used herein, is defined as the percentage of the salt in the feed water rejected by the membrane. It may be calculated by the equation:

Percent salt rejection $$= \left(1 - \frac{\text{salt concentration in permeate}}{\text{salt concentration in feed}}\right) \times 100$$

The sulfate salt rejection properties of the membranes taught herein are determined using a synthetic brackish sulfate feed water containing 700 p.p.m. (0.07%) calcium sulfate, 400 p.p.m. (0.04%) magnesium sulfate, and 400 p.p.m. (0.04%) sodium sulfate, for a total solids content of 1500 p.p.m. (0.15% mixed sulfate salts. This mixture simulates many ground waters in mid-continent North America. The phosphate salt rejection properties of these membranes are determined using a feed solution containing 100 p.p.m. of phosphate ion as trisodium phosphate. The concentration of the salt in the permeate may be determined conductometrically or by chemical analysis.

Figures 1, 2:
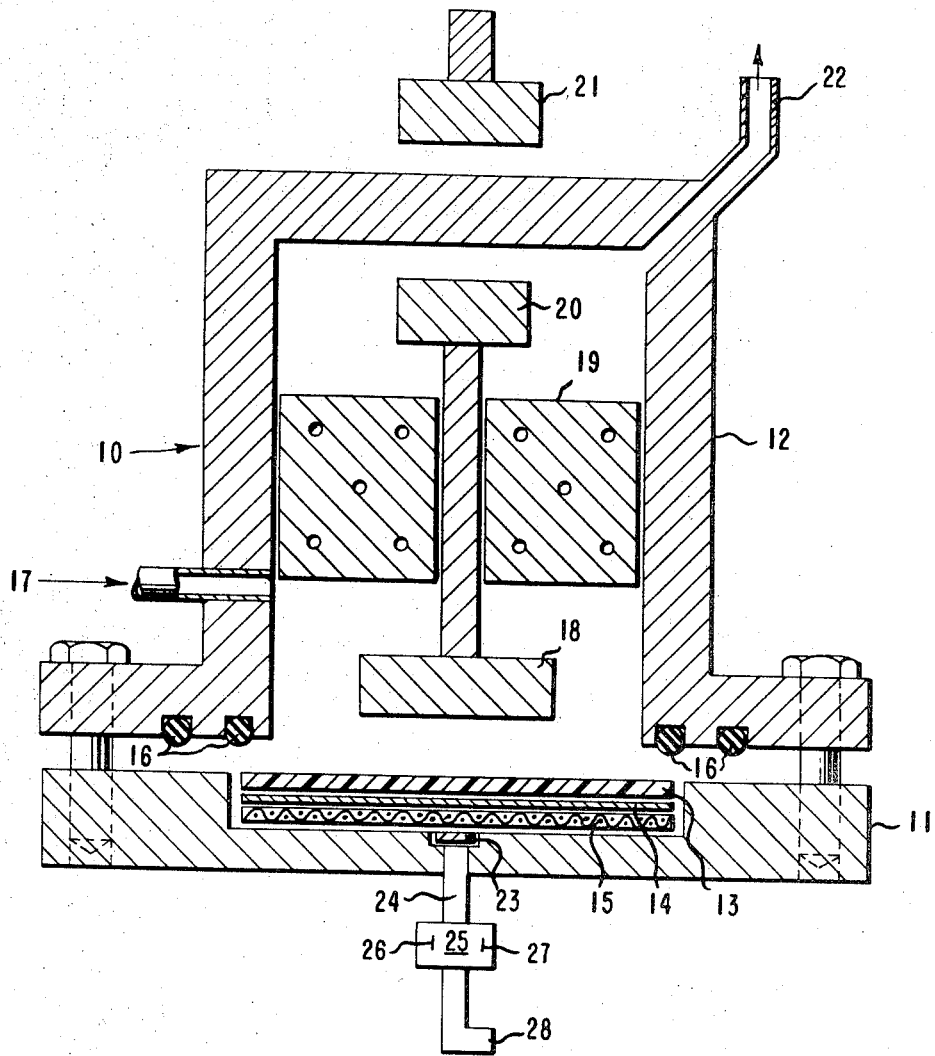
FIG. 1 is an elevation in section of a permeation cell used in measuring the permeation properties of reverse osmosis membranes in thin film form.
FIG. 2 is an elevation in section of a permeation cell used in measuring the permeation properties of reverse osmosis membranes in hollow fiber form.

The permeation test cells of FIGS. 1 and 2 may be used to determine the water permeabilities and salt rejection rates of film and hollow fiber membranes, respectively. Referring now to FIG. 1, base section 11 and upper section 12 of permeation cell 10 are machined from blocks of rust-proof metal. Film 13, the reverse osmosis membrane, is a disk mounted on a layer of filter paper 14 against a stainless steel wire screen 15. When upper section 12 of the cell is bolted to lower section 11, synthetic elastomer O-rings 16 seat firmly around the periphery of the membrane and against the metal. Inlet 17 for feeding fluid into the cell is near the membrane. The fluid is agitated by a magnetically driven stirrer blade 18, positioned by support 19 and controlled by external and internal magnets 20 and 21 to ensure contact of fresh fluid with the membrane surface at all times. Recirculation of the feed fluid is provided through the feed exit 22. Fluid passing through membrane 13 is collected through a metal frit 23 into a small conductivity cell 25 where electrical connections 26 and 27 permit determination of salt content to be made by means of a conductivity bridge (not shown). From conductivity cell 25 the fluid passes into pipe 28 where its volume and flow rate are observed. Other test cells of similar design, which avoid the development of a stagnant layer of concentrated salt solution near the membrane, may also be used.

FIG. 2 shows a permeation cell suitable for use with hollow fiber membranes. In permeation cell 40, casing 41 contains hollow fiber bundle 44 which is potted in end plugs 42 and 43. One end of bundle 44 extends through end plug 43 into collecting chamber 45 and the other through plug 42 into chamber 49. Fluid is fed into cell 40 through feed inlet 46, permeates through the walls of the fibers, passes through the hollow interior thereof into collection chambers 45 and 49 and is withdrawn through exits 47 and 50. Excess fluid not permeated is withdrawn through casing exit 48.

Figure 3:
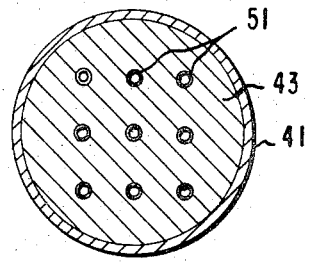
FIG. 3 is a section along line 3—3 of a cell of the type of FIG. 2.

FIG. 3 illustrates a section through plug 43 of a cell similar to that of FIG. 2, and shows the hollow ends of individual fibers 51 (not to scale) extending through plug 43 mounted in casing 41. It will be understood that bundle 44 may actually contain millions of fibers.

An epoxy resin suitable for potting the ends of bundle 44 thereby forming plugs 42 and 43 can be prepared by mixing 100 grams of an epoxy polymer modified with butyl glycidyl ether ("ERL 2795," Smooth-On Manufacturing Company), 16 grams of a modified aliphatic amine adduct ("Sonite 15," Smooth-On Manufacturing Company), and 20 grams of triphenyl phosphite ("Mod-Epox," Monsanto). The resin is cast around the fiber ends in a suitable mold immediately after mixing and the resin is allowed to set up by storing at room temperature for 16 to 24 hours.

Figure 4:
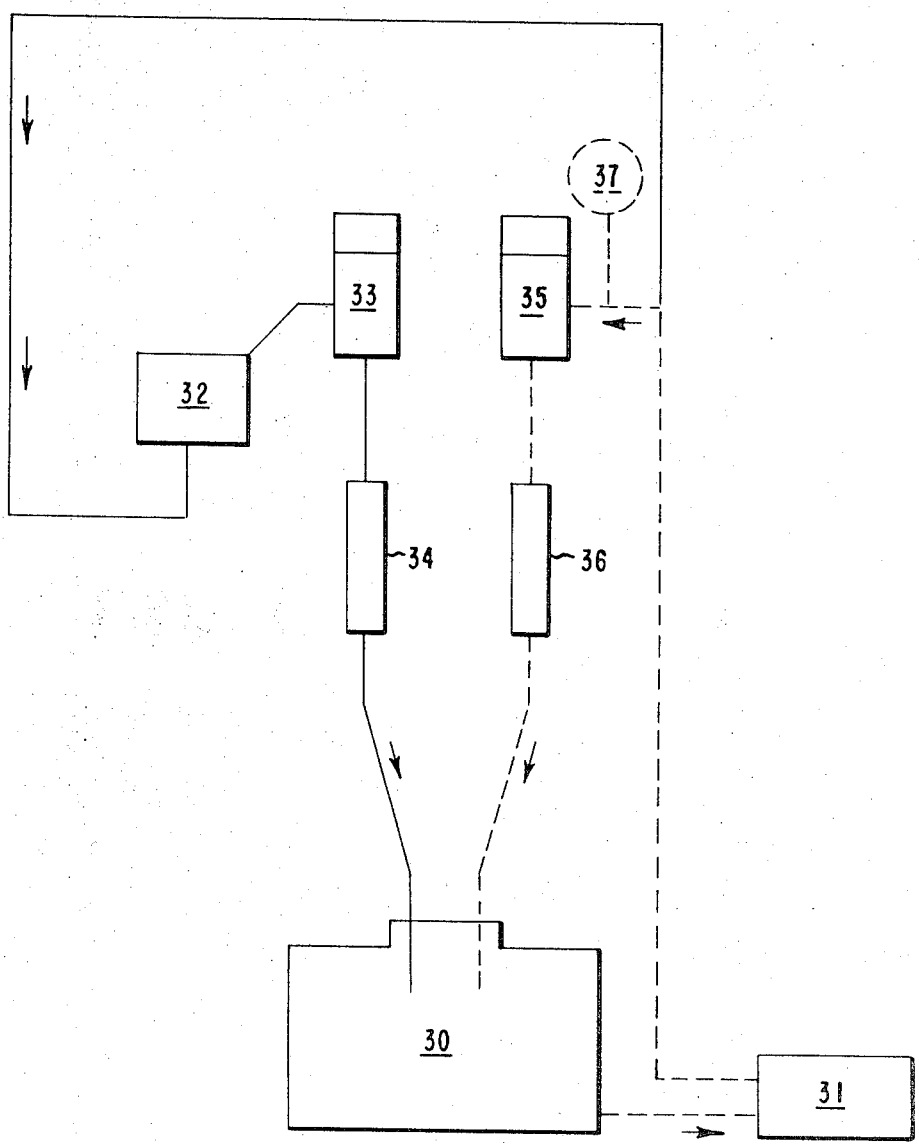
FIG. 4 is a schematic diagram of a pumping and control system used with the permeation cells of FIGS. 1 and 2.

FIG. 4 shows a pumping system for providing circulation of feed fluid and maintenance of presence inside the permeation cell during water permeability and salt rejection determination. Fluid is circulated from reservoir 30 by pump 31 through the cell represented by block 32, which may be the cell of either FIG. 1 or FIG. 2, pressure regulator 33, flow meter 34 and back to reservoir 30. Temperature is controlled as desired by placing the cell and permeate measuring equipment in an air bath (not shown) monitored by a thermocouple (also not shown) mounted adjacent to the test film inside the cell. Alternatively, the cell may be placed in a water bath. Regulator 35 and flow meter 36 permit excess fluid from the pump to by-pass the permeation cell and return to the reservoir. Pressure is monitored by gauge 37. Conventional piping is, of course, supplied to connect the units of the control system as indicated.

The water permeability and salt rejection determinations should be carried out under specified temperature and pressure conditions since variations in these conditions may affect the results. The water permeability and salt rejection limits specified herein are based upon determinations at feed pressures of about 400–600 p.s.i. and temperatures near ambient. Using relatively dilute solutions under these conditions, the osmotic pressures of the feed and permeate solutions are relatively small compared to the feed pressure, and thus have been ignored in the water permeability calculations. Preferably, the determinations are carried out at a feed pressure of about 500 p.s.i. and a temperature of 20–30° C. The passage of feed solution through the membrane usually does not exceed about 10% and preferably is less than about 5%.

The design requirements for an economical commercial plant using reverse osmosis place limitations on the water permeability and salt rejection characteristics of the membrane. One of the more efficient plant designs involves the use of membranes in the form of small hollow fibers. It has been estimated that hollow fiber membranes with water permeabilities of at least about 50 and sulfate salt rejections of at least about 70% can be used economically at convenient operating pressures to produce potable water in about 80% of the United States communities having brackish sulfate water supplies containing more than the 250 p.p.m. sulfate impurity level generally considered to be the maximum acceptable for potable water. Purification plants using membranes with water permeabilities below about 50 would not be economical since they would require excessively large membrane surface areas. Similarly hollow fiber membranes having phosphate salt rejections of at least about 70% can be used economically to remove objectionable quantities of phosphate ions from waste streams.

The membranes of this invention typically have water permeabilities of about 50–50,000. Membranes having sulfate salt rejections of at least 70% generally have water permeabilities of about 50–2,000, while membranes having phosphate salt rejections of at least 70% generally have water permeabilities of about 50–50,000. The preferred membranes of this invention are hollow fibers having water permeabilities of at least about 100 and sulfate salt rejections of at least about 70%.

Figure 5:
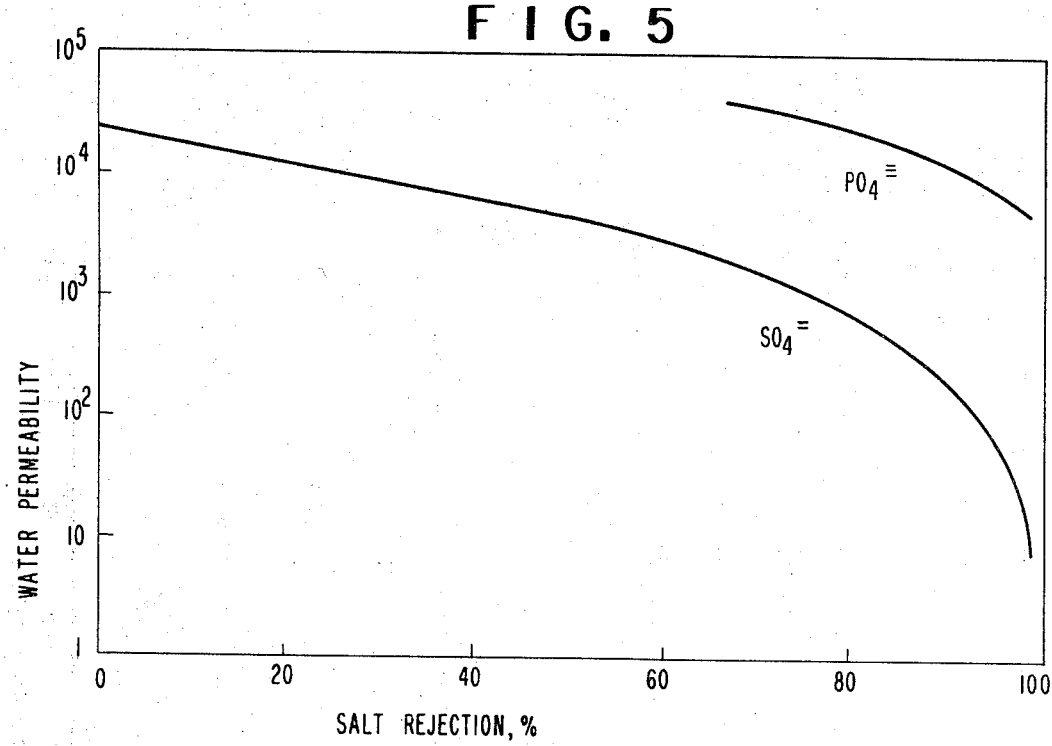
FIGS. 5 and 6 are graphs which show the interrelationship of various properties of treated membranes.

The water permeability and salt rejection of the treated polyamide membranes of this invention have been found experimentally to generally follow the inverse relationship shown graphically in FIG. 5. The membranes with higher water permeabilities have lower salt rejections. For example, thin untreated polyamide membranes typically have water permeabilities of only about 3 and sulfate salt rejections above about 99%. Mildly treated polyamide membranes with water permeabilities near 50 typically have sulfate salt rejections of about 98%. More highly treated polyamide membranes with sulfate salt rejections near 70% typically have water permeabilities of about 2,000. Even more severely treated membranes with phosphate salt rejections near 70% have water permeabilities of about 50,000.

(2) Polyamide resins

The membranes which are treated in accordance with this invention to improve their permeation properties are composed of synthetic, substantially linear, aliphatic polyamide resins. By "aliphatic polyamide" is meant the polymers described by Carothers in U.S. Pats. 2,071,253, 2,130,523 and 2,130,948 and other similar synthetic polymers. Suitable polymers are characterized by recurring

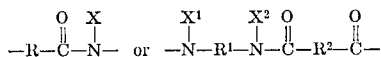

groups in the polymer chain, where R, R¹ and R² are divalent aliphatic radicals containing at least two carbon atoms and at least half of X, X¹ and X² are hydrogen and any remaining X, X¹ and X² are monovalent saturated aliphatic hydrocarbon radicals containing up to about four carbon atoms. These polyamides are free of hydrophilic substitution. Preferably all of X, X¹ and X² are hydrogen.

By "resin" is meant a polymer having a molecular weight of sufficient magnitude that it is fiber-forming and has a non-tacky surface at room temperature. High molecular weight fiber-forming polyamides of this structure are commonly known as nylons. These polymers are generally prepared by the homopolymerization of an aliphatic monoaminocarboxylic acid or derivative including the corresponding lactam (e.g. nylon 6) or by the condensation of an aliphatic diamine with an aliphatic dicarboxylic acid (e.g. nylon 66). Preferably the polyamide is a condensation product of adipic acid and hexamethylene diamine.

The term "substantially linear" is meant to include polymers which may contain minor amounts of cross-linking and chain-branching, provided the polymer exhibits the general solubility and melting characteristics of a linear polymer as distinguished from a highly cross-linked polymer. These distinctions are well known to those skilled in the art and have been comprehensively treated by Flory in Principles of Polymer Chemistry, Cornell University Press, Ithaca, N.Y. (1953), pages 46–50.

Commercial polyamide resins which are particularly suitable for making the treated membranes of this invention include Allied Chemical's "Plaskon" type 201 nylon 6, Gulf Oil's Nylon Resin Formulation 401 nyoln 6, Du Pont's "Zytel" 42 nylon 66, and Du Pont's "Zytel" 43 nylon 66. As commercially available, these resins may contain small amounts of unreacted monomers, delustering agents, coloring materials, and other components with no significant effect on their membrane properties.

(3) Membranes

The polyamide membranes which are treated in the manner taught herein to provide improved reverse osmosis barriers are generally about 2–75 microns thick and are preferably about 5–40 microns thick. These membranes may be non-porous flat films made by well known melt-casing procedures which involve extruding the molten polymer through a slit die onto a polished, temperature-controlled, quench roll. Such films can also be made in tubular form by extrusion through annular dies and blowing. Suitable techniques for preparing tubular films are taught by Dyer and Heinstein in U.S. Pat. 2,966,700.

The polyamide membranes may also be in the form of small hollow fibers such as those made by melt extrusion through circular dies and spinnerets as taught in French Pat. 990,726 and in British Pat. 859,814. Polyamide hollow fibers of textile size are preferably made by melt spinning nylon 66 with a screw melter, a sand filter pack, and a sheath-core spinneret of the type shown by Breen et al. in U.S. Pat. 2,999,296. The polyamide resin should have a relative viscosity in the range of about 45 to 53 as defined by Spanagel on page 2 of U.S. Pat. 2,385,890. Fibers of suitable size are obtained with spinnerets having plate hole diameters near 40 mils and insert diameters near 35 mils by adjustment of melter, sand pack, and spinneret temperatures, air quench, and wind-up speed.

The hollow fibers which are useful herein generally have outside diameters of about 10–250 microns and wall thicknesses of about 2–75 microns. Preferably they have outside diameters of about 15–150 microns and wall thicknesses of about 5–40 microns. In general, the fibers with smaller outside diameters should have thinner walls so that the ratio of the cross-sectional area of the internal bore of the fiber to the total cross-sectional area within the outer perimeter of the fiber is about 0.12–0.60, that is, about 0.12:1 to 0.60:1. Preferably the ratio is about 0.18–0.45.

(4) Membrane treating process

The procedure used to treat polyamide membranes to render them suitable for use in the reverse osmosis process of this invention is relatively simple. A suitable polyamide membrane is treated with a treating agent selected from the group consisting of certain protonic acids, selected lyotropic salts and specified Lewis acids. The treating composition may be heated or cooled to the desired treating temperature and brought into contact with the membrane by immersing the membrane in the composition or by any other convenient technique. After the desired treating time, the treating composition is removed from contact with the membrane and the membrane is washed substantially free of the treating composition with a suitable rinse medium. The resulting treated membrane is then ready for use in the reverse osmosis separation of aqueous mixtures.

One class of treating agents which are useful in treating polyamide membranes includes certain protonic acids. Protonic acids are compounds of the general formula HA, in which H represents hydrogen and A represents an anion, which react with water to establish the equilibrium $$HA + H_2O \rightleftharpoons H_3O^+ + A^-$$

The strength of a protonic acid is indicated by the extent to which this equilibrium reaction is displaced toward the formation of the hydronium ($H_3O^+$) ion and the anion ($A^-$). This displacement may be expressed in two ways, namely in terms of the acid strength constant pKa of the acid in water and the pH of a 0.01 molar aqueous solution.

The acid strength constant, pKa, is defined by the expression:

$$pKa = -\log \frac{(H_3O^+)(A^-)}{(HA)}$$

in which the terms in the brackets are the molar concentrations of the various components in gram formula weights per liter of solution. Additional details with respect to the measurement and significance of protonic acid strengths are described by Braude and Nachod on pages 568–571 of Determination of Organic Structures by Physical Methods, Academic Press, New York (1955).

The pH of an aqueous acidic solution is a function of the hydronium ion concentration and is defined by the expression: pH = $-\log (H_3O^+)$. Techniques for determining the pH of aqueous solutions, such as the use of a colored indicator or calomel cell, are well known.

The protonic acids which are useful as treating agents in making the membranes used in accordance with this invention have pKa values not greater than about 10.3. Protonic acids with pKa values above about 10.3 are not effective treating agents. They tend to have such low solvencies for polyamides that they do not swell them appreciably, dissolve significant amounts of the polymer under the treating conditions of the process, or otherwise affect their physical structure. Preferably the pKa of the protonic acid is not greater than about 7. Aqueous solutions of protonic acids with pKa values below about 3.0 have a tendency to react with polyamides to degrade them chemically, particularly by hydrolysis. Thus, such acids are preferably used in dilute solutions in order to reduce their chemical reactivity.

The protonic acids which are useful as treating agents in accordance with this invention also give aqueous solutions having a pH not in excess of about 6.3 at a 0.01 molar concentration at 25° C. Protonic acids which have pKa values not greater than about 10.3, but which have pH values above about 6.3 in 0.01 molar solutions, are insufficiently active as treating agents to produce the improved polyamide membranes used in accordance with this invention.

Suitable organic protonic acids which are useful as membrane treating agents in accordance with this invention include carboxylic acids such as formic, acetic, propionic, acrylic, butyric, isobutyric, butenoic and benzoic acids, and any of these acids in which one to three of the hydrogen atoms, other than the acidic hydrogen atom, are replaced by one or more substituents selected from the group consisting of —F, —Cl, —Br, —CN, —COR, —SO$_2$R, —OH, —CHO, —OR, —SOR, —NO$_2$, —COOR, —COOH, —CONR$_2$, —SR, and —SO$_2$NR$_2$ in which R is —CH$_3$ or —C$_2$H$_5$. Also suitable are the corresponding organic sulfonic acids and chloral hydrate. The aliphatic carboxylic acids of one to three carbon atoms, benzoic acid, and the chlorine substituted derivatives thereof are the preferred carboxylic acids. A particularly preferred treating agent is formic acid.

Suitable inorganic protonic acids which are useful membrane treating agents include hydrochloric, hydrobromic, hydrofluoric, sulfuric, nitric and phosphoric acids. The preferred inorganic acids are those with a pKa below about 2.5. Hydrochloric and phosphoric acids are the most preferred inorganic acids.

Suitable phenolic protonic acids which are useful as membrane treating agents include phenol and the substituted phenols in which one to three of the hydrogens attached to benzenoid carbon atoms are replaced by one or more substituents selected from the group consisting of —F, —Cl, —Br, —CN, —COR, —SO$_2$R, —OH, —OR, —SOR, —NO$_2$ —COOR, —CONR, —SR, —SONR$_2$, and —R in which R is —CH$_3$ or —C$_2$H$_5$. Phenol and o-cresol are the preferred phenolic treating agents.

For illustration, the pKa's of some suitable protonic acids are given in Table I.

TABLE I

| Protonic acid: | pKa |
|---|---|
| Sulfuric acid | Below 0 |
| Hydrochloric acid | Below 0 |
| Trifluoroacetic acid | Below 0 |
| Benzene sulfonic acid | 0.70 |
| Trichloroacetic acid | 0.70 |
| Picric acid | 0.8 |
| Oxalic acid | 1.23 |
| Dichloroacetic acid | 1.48 |
| Chloroacetic acid | 1.85 |
| Phosphoric acid | 2.12 |
| Fumaric acid | 3.03 |
| Citric acid | 3.08 |
| Lactic acid | 3.08 |
| Hydrofluoric acid | 3.45 |
| Formic acid | 3.75 |
| Glycolic acid | 3.83 |
| Itaconic acid | 3.85 |
| 2,4-Dinitrophenol | 3.96 |
| Succinic acid | 4.16 |
| Benzoic acid | 4.19 |
| Acrylic acid | 4.25 |
| Acetic acid | 4.75 |
| Propionic acid | 4.87 |
| o-Nitrophenol | 7.17 |
| o-Chlorophenol | 8.48 |
| Phenol | 9.89 |
| Chloral hydrate | 10.04 |
| m-Cresol | 10.01 |
| p-Cresol | 10.17 |
| o-Cresol | 10.20 |

A second class of treating agents which are useful for treating polyamide membranes to render them useful in accordance with this invention includes selected lyotropic salts. Suitable lyotropic salts are those salts containing a cation and an anion listed in Table II in which the anion is higher in the list than the cation.

TABLE II

| Cation: | Anion |
|---|---|
| K$^+$ | SCN$^-$ |
| NH$_4{}^+$ | |
| Cd$^{++}$ | |
| Al$^{+++}$ | |
| Na$^+$ | I$^-$, Br$^-$, Cl$^-$ |
| Fe$^{+++}$ | |
| Ba$^{++}$ | |
| Ca$^{++}$ | NO$_3{}^-$ |
| Li$^+$ | |
| Mg$^{++}$ | |
| Ga$^{+++}$ | |
| Sb$^{+++}$ | |
| In$^{++}$ | |
| Tl$^{+++}$ | |
| Sn$^{++++}$ | |
| Zn$^{++}$ | |
| Ni$^{++}$ | |
| Co$^{++}$ | |
| Mn$^{++}$ | |

The preferred lyotropic salts include potassium, ammonium, and sodium thiocyanates; calcium, lithium, magnesium, and ferric thiocyanates, bromides and chlorides; and zinc, cobaltous and manganous thiocyanates, bromides, chlorides and nitrates. The most preferred lyotropic salt treating agents are zinc chloride and calcium chloride.

The third class of treating agents which are useful for treating polyamide membranes in accordance with this invention is a selected group of Lewis acids. Suitable Lewis acids include aluminum halides of the formula AlX$_3$ in which X is chlorine or bromine, and boron halides of the formula BX'$_3$ in which X' is fluorine, chlorine or bromine. Boron trifluoride and aluminum chloride are the preferred Lewis acid treating agents.

The concentration of the treating agent in the liquid composition used to treat the polyamide membrane may vary from about 1–100% by weight. If the selected treating agent is liquid and gives the desired treating result at a practical treating time and temperature, the agent may be used as 100% of the treating composition. In most cases, however, it is desirable to use the treating agent dissolved in a suitable solvent, which allows the treating agent to be available in a physical form suitable for use at a concentration which will give the desired treating result at a convenient temperature and a practical time.

Useful solvents are liquids in which the treating agent is sufficiently soluble to provide effective treating action, but which are essentially chemically inert toward the treating agent, that is, do not react or complex chemically with the treating agent so as to prevent it from functioning as a swelling agent and partial solvent for the membrane. In the same way the solvent should be essentially chemically inert toward the membrane and essentially a non-solvent for the membrane under the treating conditions used. In some cases the solvent may moderate or enhance the activity of the treating agent.

Suitable solvents which are useful with one or more different treating agents include water; lower alkyl halides such as methylene chloride, chloroform, carbon tetrachloride and dichloroethylene; aliphatic hydrocarbons such as n-hexane and isooctane; aromatic hydrocarbons such as benzene, toluene and the xylenes; ketones such as acetone and methyl ethyl ketone; aliphatic acids such as acetic acid and propionic acid; aliphatic acid amides such as dimethylformamide, and dimethylacetamide; aliphatic sulfur compounds such as dimethylsulfide, dimethylsulfoxide and butylene sulfone; aliphatic alcohols such as methanol, ethanol and isopropanol; and aliphatic ethers such as methyl isobutyl ether, tetrahydrofuran and diethoxydiethyl ether. The preferred solvents are water, methanol, ethanol, chloroform and acetic acid. Some solvents, such as acetic acid, have also been listed as efficient treating agents. The temperature at which the treating process is carried out will determine whether such compounds function primarily as a treating agent or as a solvent.

Typical treating agent-solvent combinations which are useful are given in Table III.

TABLE III

| Treating agent: | Solvent |
|---|---|
| Formic acid | Water. |
| Do | Chloroform. |
| Acetic acid | Water. |
| Chloroacetic acid | Do. |
| Do | Chloroform. |
| Dichloroacetic acid | Water. |
| Do | Chloroform. |
| Trichloroacetic acid | Water. |
| Phosphoric acid | Do. |
| Do | 2,2'-diethoxydiethyl ether-water. |
| o-Chorophenol | Ethanol. |
| Chloral hydrate | Water. |
| Phenol | Do. |
| Calcium chloride | Methanol-water. |
| Potassium thiocyanate | Methanol. |
| Zinc nitrate | Do. |
| Cobaltous nitrate | Do. |
| Manganous thiocyanate | Do. |
| Manganous bromide | Do. |
| Manganous nitrate | Water. |
| Ferric chloride | Methanol. |
| Boron trifluoride | Do. |

Preferred treating agent concentrations depend on the activity and the solubility of the treating agent in the solvent and on the treating temperature. For instance, in the case of aqueous formic acid, the preferred treating compositions contain between about 45% and about 70% by weight formic acid, and produce useful membranes by treatments of a few minutes to a few hours at temperatures between about 80° C. and ambient. On the other hand, when the treating composition is formic acid in chloroform, the formic acid concentration preferably is in the range of about 1 to 4%. Concentrations of formic acid in chloroform as low as 4% produce drastic overtreatments in treating times as short as 7 minutes at ambient temperature. Another preferred treating composition contains 15% to 25% calcium chloride, 50% to 70% methanol, and 10% to 25% water. Preferred concentrations of lyotropic salts such as calcium chloride and zinc chloride are higher in water than in methanol or methanol-water mixtures. Other preferred compositions include boron trifluoride at concentrations up to about 20%, but below its maximum solubility, in non-reactive oxygenated solvents such as methanol; and aluminum trichloride at concentrations up to about 35%, but below its maximum solubility, in non-reactive hydrocarbon solvents.

Useful treating temperatures include the full range of temperature over which the treating composition can be handled conveniently as a liquid mixture. The treating temperature may range from temperatures at least high enough to maintain the treating composition as a single liquid phase, that is, above the temperature at which some component separates as a solid because of freezing or reduced solubility, to temperatures not in excess of the boiling point of the treating composition. At the boiling point of the treating composition reflux should be provided to maintain the concentration of the treating agent. Treating temperatures of about 20–80° C. are preferred for convenience.

The treating times required for modification of the polyamide membranes may range from a few seconds to a few days. With many treating compositions, for example aqueous formic acid or calcium chloride-methanol-water solutions, the physical changes involved in the modification are complete in a few minutes to about an hour and additional exposure of the membrane to the treating solution causes no significant change in its properties. Such treating compositions are preferred when the ployamide membrane is dipped batchwise into a vat containing the treating composition and precise control of the treating time is not practical.

With other treating compositions, such as 5% formic acid in chloroform, long-time exposure of the polyamide membrane to the treating composition causes such extensive overtreatment that the membrane may be destroyed, whole short-time exposure to the same treating composition can produce a useful membrane. Such compositions are preferred for the rapid and continuous treatment of polyamide membranes in continuous flat film or hollow fiber form. Such treatments usually involve passing, for example, continuous hollow fibers through a vat of the treating composition for a treating time sufficient to allow the desired modification of the fibers, and then passing the fibers directly into a rinse bath.

The permeation properties of the treated membrane will depend upon the treating composition and the treating conditions used. After a particular polyamide, treating agent, and solvent have been chosen, determination of the specific treating conditions of concentration of treating agent, temperature and time which give the desired treating result is relatively easy.

With most treating compositions, the severity of the treatment increases as the concentration of the treating agent is increased and the temperature of the treatment is increased. Both of these changes, in general, increase penetration of the treating agent into the membrane due to increased swelling of the polymer and increased solubility of the treating agent in the polymer. These changes also increase the treating effect by increasing the solubility of the polyamide in the treating composition. In general, too low a treating agent concentration or too low a treating temperature will give a result which is insufficient to provide the desired membranes. Similarly, too high a treating agent concentration or too high a temperature will result in overtreatment of the membrane with a resulting salt rejection which is too low.

Figure 16:
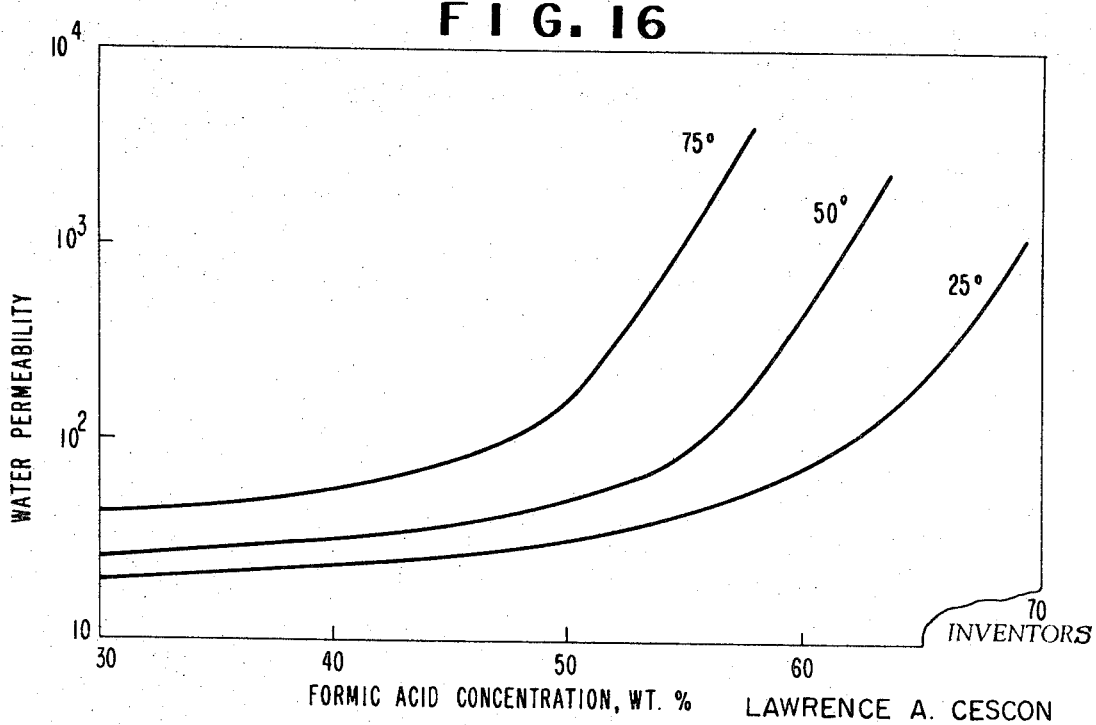
FIG. 16 is a graph showing the interrelationship between membrane treating conditions and the resulting water permeability of the treated membrane.

Since the water permeability of the membrane is, in general, increased by increasing the treating agent concentration and by raising the treating temperature, equivalent degrees of treatment can be obtained with lower treating agent concentrations and higher temperatures or with higher treating agent concentrations and lower temperatures. Those relationships are shown for formic acid in the curves of FIG. 16. These curves are the temperature curves obtained by plotting formic acid concentration against the water permeability resulting from a four-hour treatment. It can be seen from these graphs that it is a simple matter to determine a suitable combination of treating agent concentration and treating temperature once the polyamide resin, treating agent, treating time and desired water permeability have been chosen. In a similar manner, the data given in the following examples can be used as a guide for determining suitable treating conditions in the case of treating agents other than formic acid.

In the case of some phenolic treating agents, a somewhat different phenomenon takes place. Increasing the temperature shifts the solubility properties so as to reduce penetration of the treating agent into the polymer. With such agents, changes in water permeability are greater at lower temperatures. Phenol, for example, has partition coefficients between nylon 66 and water of 14.3 at 25° C. and 8.1 at 70° C. as shown by Forward et al. in the Journal of the Textile Institute, volume 45T, page T524 (1954). Accordingly, aqueous phenolic solutions are more active treating compositions at lower temperatures than at higher temperatures. Because of its high solubility in polyamides and its high solvency for polyamides, aqueous phenol is an effective treating composition at relatively low phenol concentrations.

The amount of treating composition used to treat a particular amount of polyamide membrane is not critical so long as sufficient treating composition comes in contact with the membrane to dissolve the desired amount of polymer. The minimum required amount is smaller when using a treating composition in which the polyamide is highly soluble than when using a treating composition in which the polyamide is only sparingly soluble. The use of an excessively large amount of treating composition, of course, increases the cost and complexity of the treating process without any attendant advantage.

Rinsing the treated polyamide membranes to remove the treating agent may be carried out in any convenient manner for example by the batchwise immersion of the membrane in one or more rinse vats with periodic or continuous renewal of the rinse composition, by continuous passage of the membrane in film or hollow fiber form through a series of vats, or by any other practical technique. Rinsing is preferably carried out without heating or cooling of the rinse composition, but may be carried out at any temperature below the treating temperature. It is continued until the residual amounts of the treating composition have no harmful effect.

The medium used to rinse the treated membrane may be water or any other liquid rinse medium which contains at least 25% by weight water, is a solvent for the treating agent, and is essentially inert toward the membrane under the rinse conditions. Accordingly, any of the solvents useful in the treating composition are also useful in the rinse medium. The preferred rinse medium is water, particularly when the treating composition contains water or is a water-soluble mixture. Water rinses are also sometimes effective in removing water-insoluble solvents from polyamide membranes, especially when the treating agent is water soluble. For example, water rinsing effectively removes a mixture of formic acid and chloroform and leaves the membrane wet with water. Other treating compositions are more effectively rinsed from the treated membrane by a series of rinses starting with a rinse composition in which both the treating agent and the solvent are highly soluble, for instance initial rinsing with a lower alcohol-water mixture, and final rinsing with water.

The treated and rinsed polyamide membrane is preferably kept wet with a medium which contains at least 25% by weight water and is essentially inert toward the membrane until it is installed in a suitable apparatus and used in a reverse osmosis process. Drying the treated membrane and rewetting it for use causes changes in its physical structure which result in a significant decrease in its water permeability and therefore reduces its value as a reverse osmosis membrane. Retreating the dried membrane will again increase its water permeability, but the overall characteristics of the membrane may be somewhat different from the properties of the original treated membrane before it was allowed to dry.

It is preferable that the membrane be left wet with water after the final rinse since the membrane will most commonly be used for water purification. However, other rinse compositions can be used, if desired, particularly when the membrane is to be used to purify a fluid containing liquid components in addition to water.

Figure 6:
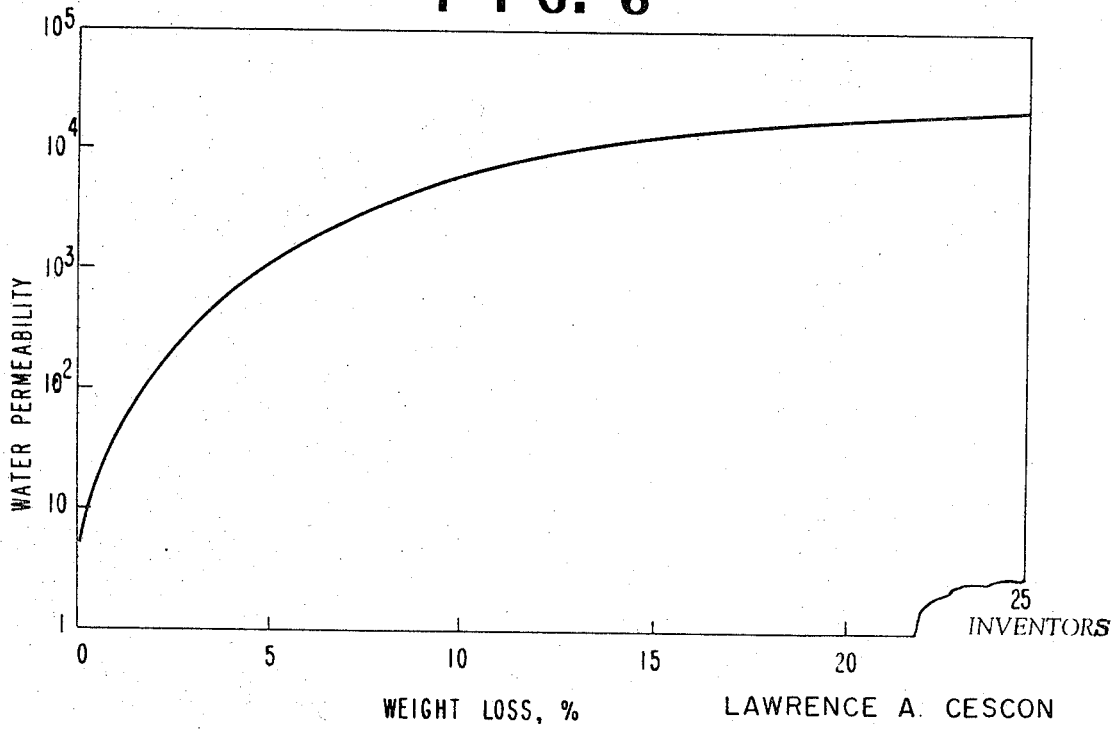

(5) Treated membrane characterization (a) Weight loss.—The membrane treating process taught herein results in a weight loss for the membrane which is related to the water permeability properties of the treated membrane as shown in FIG. 6. Treating processes resulting in weight losses of less than about 0.2% produce no significant change in membrane properties. Treating processes which result in weight losses of about 1% produce membranes with water permeabilities near about 50. Processes which result in weight losses near 6% produce membranes with sulfate salt rejections near about 70%. Weight losses near about 35% produce membranes with phosphate salt rejections near the minimum of about 70%. Weight losses above about 35% result in membranes with phosphate salt rejections which are too low to economically purify most waste waters containing phosphate ions. Accordingly, useful desalination membranes are obtained when treating process results in a weight loss in the range of about 1–35%. Preferably, the treating process results in a weight loss of about 1–6% which provides membranes suitable for purifying brackish water containing sulfate ions.

The exact nature of the weight loss which occurs during the treating process is not completely understood. Attempts to define the nature of the weight loss are complicated by changes in the dimensions of the membrane, particularly changes in the relative area and thickness of the membrane during the treating process and during drying of the treated membrane. A typical thin film swells during the treating process, thereby increasing in area by about 50%. After rinsing the treated membrane and leaving it wet with water, its area typically is only about 90% of the original area while the thickness is about 130% of the original thickness. If this wet membrane is dried, its area typically decreases to about 80% of the original area and the thickness decreases to about 115% of the original thickness. Thus, observation of the dry membrane by ordinary optical microscope techniques does not give a true indication of the microscopic structure of the wet membrane which is used in the reverse osmosis process.

Although it is not intended that this invention be limited to any particular theory as to the mechanism of treatment or the exact structure of the resulting membrane, it is believed that the treated membrane may contain many submicroscopic crevices and/or pores which permit increased penetration of water into and through the membrane. By "crevices" are meant holes, cracks, and other openings in the surface of the film which penetrate only part of the way through the film and therefore permit penetration of fluids into the film without permitting Newtonian flow of fluids through the film. By "pores" are meant holes, cracks and other openings which penetrate all the way through from one surface of the film to the other and which therefore permit some Newtonian flow of fluids through the film. It is believed that these crevices and/or pores may be formed by swelling of the membrane and by dissolution of a small amount of low molecular weight polymer during the treating process. The theory that treated membranes contain small holes, cracks or pores is supported by the observation that the membrane increases in whiteness and opalescence during the treating process.

(b) X-ray diffraction.—The treating process of this invention also results in some changes in the fine structural details of the membrane which can be observed by X-ray diffraction techniques. These fine structural details relate to the degree of orientation of the crystallites in the polymer, to the degree of crystallinity of the polymer, and to the size and number of X-ray scattering centers present in the membrane.

(1) Orientation.—When the treated membranes used in accordance with this invention are hollow fibers, they are characterized, when dry, by wide angle X-ray diffraction patterns in which the (100) diffraction arcs have orientation angles of less than about 50° and the (010, 110) diffraction arcs have orientation angles of less than about 100°. The orientation angles are a measure of the degree of orientation of the crystallites in the polyamide polymer. The orientation angle can be determined by an analysis of the wide-angle X-ray diffraction pattern as described by Krimm et al. in the Textile Research Journal, volume 21, pages 805–822 (November 1951), by Heffelfinger et al. in the Journal of Applied Polymer Science, volume 9, pages 2661–2680 (1965), and by Knoblock et al. in U.S. Pat. 3,299,171.

Wide angle X-ray diffraction patterns are made by passing through the sample $CuK_\alpha$ radiation of 1.54 Angstrom wavelengths which has been filtered through nickel foils to reduce the strength of $K_\beta$ radiation. When the sample is hollow fibers, they are aligned perpendicular to the X-ray beam. Sufficient tension is used to straighten the fibers, while taking care not to cause additional orientation of the crystallites by drawing. A typical apparatus for obtaining wide angle diffraction patterns is illustrated in New Methods of Polymer Characterization, edited by Ke, page 233, Interscience Publishers (1964).

The wide angle X-ray diffraction pattern of a completely oriented polyamide resin is characterized by a diffraction spots 180° apart. The diffraction pattern of an unoriented polyamide is characterized by diffraction rings rather than diffraction spots since diffraction of the central X-ray beam by randomly oriented group of polymer crystallites is of equal intensity in all directions. With polyamides having a degree of orientation intermediate these two extremes, the spots spread out into arcs. The angular sizes of the arcs are a measure of the orientation angle of the crystallites of the polymer.

Figure 7:
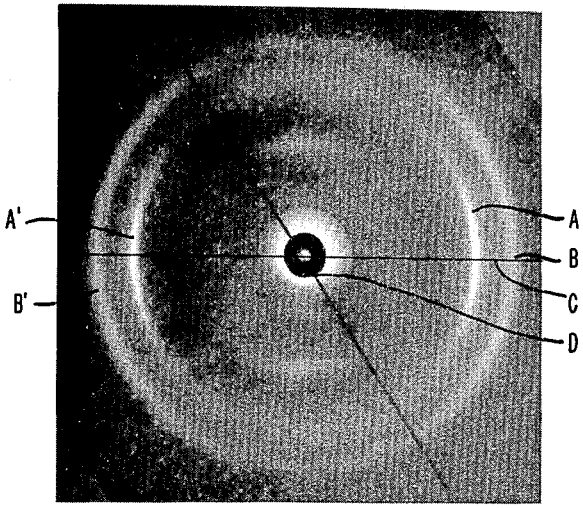
FIG. 7 is a positive print of a wide angle X-ray diffraction pattern of a typical membrane of this invention.

FIG. 7 is a positive print of a wide angle X-ray diffraction pattern of nylon 66 hollow fibers which have been treated with aqueous formic acid to give a water permeability of about 750. The inner arcs A and A' of this pattern are the diffraction arcs caused by the (100) plane of the polymer crystals; the outer arcs B and B' are the diffraction arcs caused by the (010, 110) planes of the polymer crystals. Line C is the equatorial axis which is perpendicular to the alignment of the fibers. The black object D in the center of the pattern is the central X-ray beam stop with its supporting wire.

Slightly drawn, hollow, polyamide fibers have orientation angles for the inner of (100) diffraction arcs not greater than about 50° and typically about 40–50° and orientation angles for the outer or (010, 110) diffraction arcs not greater than about 100°. These relatively large orientation angles result from the spinning process. Highly drawn fibers typically are highly oriented and have orientation angles of about 5–15° for both the (100) and the (010, 110) diffraction arcs. Undrawn polyamide hollow fibers are relatively unoriented and typically have orientation angles substantially in excess of 100 for both the (100) and (010, 110) diffraction arcs.

After mild treatments of slightly drawn polyamide hollow fibers which result in water permeabilities in the range of 50 to 100, the orientation angle of the (100) diffraction arc is essentially unchanged while the orientation angle of the (010, 110) diffraction arc is reduced to not greater than about 55° and typically is about 45–55°. After a stronger treatment which produces hollow fibers with a sulfate salt rejection near 70%, the orientation angles are reduced to about 25–35° for the (100) arcs and about 35–45° for the (010, 110) arcs. The orientation angles of undrawn polyamide hollow fibers are reduced to not greater than about 100° for both the (100) and (010, 110) diffraction arcs by a mild treatment which results in a water permeability of 50. More severe treatments result in further reductions in these orientation angles.

The membrane treatments described herein sometimes lead to an unusual wide angle diffraction pattern. Typically, each of the (010, 110) diffraction arcs occurs as a pair of off-equatorial arcs separated by about 35–45°. This separation indicates that the crystallites are tilted at an angle to the fiber axis. The diffraction pattern of FIG. 7 illustrates such a phenomenon.

Orientation angles are determined by measuring the angular size of the diffraction arcs. To do this, azimuthal densintometer traces are made of the X-ray diffraction pattern negative along the arcs of the (100) and (010, 110) diffraction planes. The diffraction arcs are plotted in the azimuthal trace as intensity peaks. The trace of the inner arcs A and A' of the negative corresponding to FIG. 7 typically shows two broad peaks 180° apart, each of which is roughly symmetrical on the equatorial axis. The trace of the outer arcs B and B' of untreated hollow fibers also typically shows two peaks 180° apart. In the case of treated hollow fibers each of these equatorial peaks typically separates into a pair of overlapping peaks, one on each side of the equatorial axis.

Figure 9:
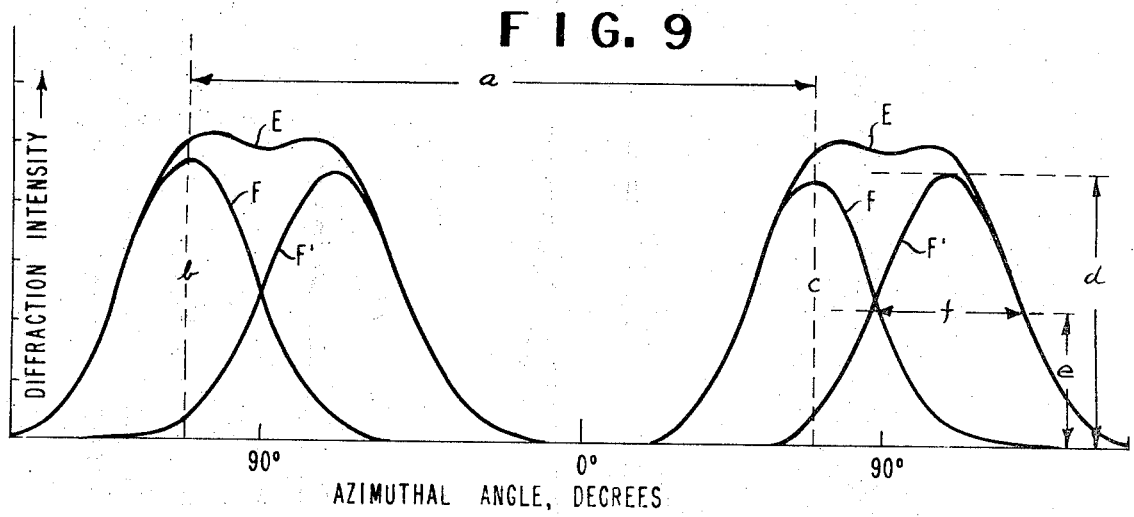
FIG. 9 is an azimuthal densitometer trace of the (010, 110) diffraction plane of the negative of the X-ray diffraction pattern of FIG. 7.

In FIG. 9, curve E is an azimuthal trace of the outer arcs B and B' of the negative of the diffraction pattern of FIG. 7 with the X-ray diffraction intensity plotted vertically in arbitrary units and the azimuthal angle plotted horizontally in degrees measured from the center of the diffraction pattern. The angular size of a diffraction arc which determines the orientation angle is measured on the azimuthal trace as the width of the intensity peak in degrees at the half-maximum intensity of the peak in the azimuthal trace.

In determining the width of the peaks in the azimuthal trace of the (010, 110) diffraction arcs, which split into a pair of off-equatorial arcs, it is necessary to first resolve each of the major peaks of the azimuthal trace into a pair of overlapping peaks. This can be done with a curve resolver such as Du Pont Model 310. Four channels of the curve resolver are adjusted to give Gaussian distribution curves. Two of these Gaussian curves are adjusted in position, width, and height so that their sum matches the double peak on one side of curve E of FIG. 9. The other two channels are similarly adjusted to match the double peak on the other side of curve E. The individual channels as well as the sum are then drawn on the curve plotter of the instrument to obtain curves E, F and F' of FIG. 9. Curve E is fitted to match the original densitometer trace. Curves F and F' are the individual resolved intensity curves whose sum equals curve E. If the curve plotter is set to exactly reproduce the densitometer trace, the angular scales are, of course, identical. When curve E of the curve plotter is not to the same scale as the densitometer trace, the distance $a$ between maximum intensity projection lines $b$ and $c$ of resolved curves F, which are known to be 180° apart, can be measured and the angular scale determined.

The effective width of each resolved peak F and F' in a four peak trace like that shown in FIG. 9 is determined by measuring the height $d$ which is proportional to the maximum diffraction intensity of one of the resolved peaks, locating the height $e$ which is equal to one-half of height $d$, drawing a horizontal line $f$ at the height $e$, and determining the length of line $f$ between its intercepts with the resolved intensity curve. The four width values $f$ obtained in this manner for the four resolved peaks in the azimuthal trace are added together and divided by four to obtain the orientation angle of the membrane.

In the case of the azimuthal densitometer trace for the (100) diffraction arcs, which do not separate into a pair of off-equatorial arcs, the widths of the two peaks can be measured directly from the densitometer trace. In this case, the two widths are added together, and the sum is divided by two. Since the azimuthal intensity trace is an essentially Gaussian curve and the measurement is made at half-maximum intensity, the physical meaning of the orientation angle is that approximately 77% of the crystallites in the polymer are aligned within the angle.

(2) *Crystallinity*.—The treated membranes used in accordance with this invention are also characterized, when dry, by wide angle X-ray diffraction patterns indicating a high degree of crystallinity, the crystal perfection index being at least about 90. The crystal perfection index is determined from the diffraction angles of the (100) and (010, 110) diffraction arcs of the same wide angle X-ray diffraction pattern used to determine the orientation angle of the polymer. The Bragg diffraction angle $2\theta_1$ is the angular displacement of the (100) diffraction arcs from the central X-ray beam. This angle can be calculated from the measured distance between the two (100) diffraction arcs and the known distance from the sample to the film in the X-ray camera. Similarly the Bragg diffraction angle $2\theta_2$ is the angular displacement of the (010, 110) diffraction arcs from the central X-ray beam.

Figure 10:
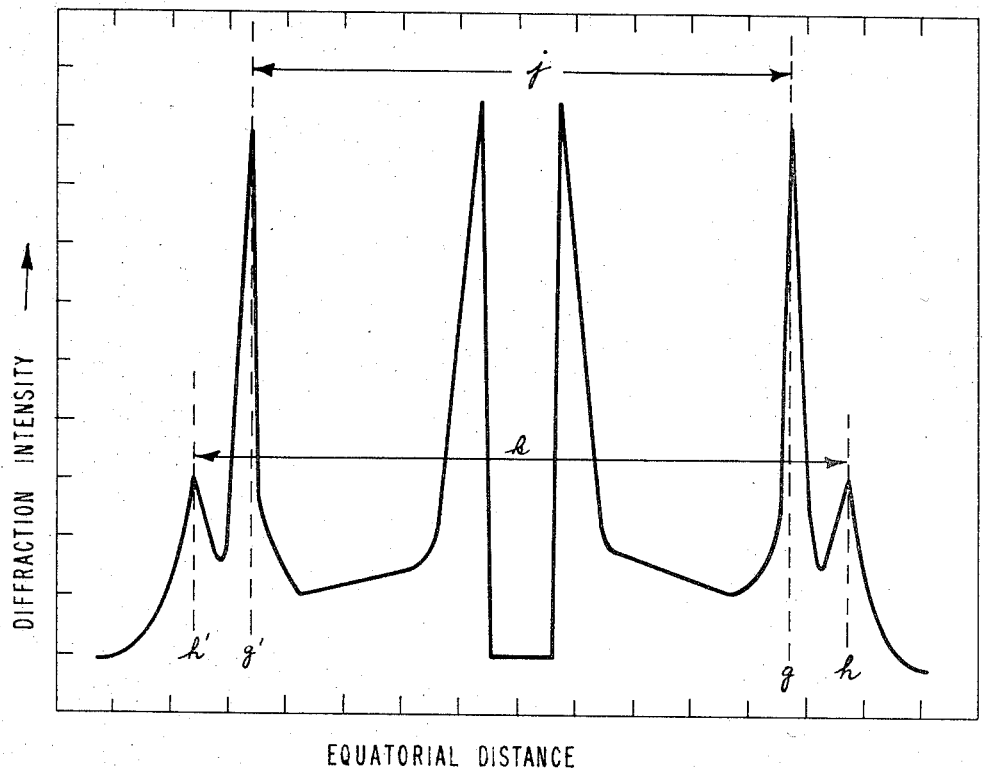
FIG. 10 is a densitometer trace along line C of the negative of the X-ray diffraction pattern of FIG. 7.

The distance between two diffraction arcs in the same azimuthal plane is measured by making a densitometer trace along the equatorial axis of the diffraction pattern. Such a trace of the negative of the diffraction pattern of FIG. 7 is shown in FIG. 10, in which the vertically-plotted X-ray diffraction intensity and the horizontally-plotted equatorial distance are arbitrary units. In FIG. 10, the tall peaks having maximum intensities at projection lines $g$ and $g'$ represent the relatively greater intensity of diffracted X-rays from the (100) planes of the crystallites and the short peaks having maximum intensities at projection lines $h$ and $h'$ represent the relatively smaller intensity of diffracted X-rays from the (010, 110) planes. The distance $j$ between maximum intensity projection lines $g$ and $g'$ and the distance $k$ between maximum intensity projection lines $h$ and $h'$ are functions of the angles of diffraction of X-rays due to the crystallities in the polymer.

To determine the crystal perfection index of a membrance, the distances $j$ and $k$ are measured and converted into the corresponding Bragg angles $2\theta_1$ and $2\theta_2$ from the known geometry of the X-ray camera and the known magnification of the densitometer system. Typical values for $2\theta_1$ are near 20° and typical values for $2\theta_2$ are near 23°. These Bragg angles are related to the interplanar spacings $d_1$ and $d_2$, of the polymer crystals. Interplanar spacing $d_1$ is the distance between the (100) planes of the polymer crystals, while interplanar spacing $d_2$ is the distance between the (010, 110) planes. These interplanar spacings can be calculated from the Bragg angles in accordance with Bragg's law using the equations:

$$d_1 = \frac{n\lambda}{2 \sin \theta_1}$$

and $$d_2 = \frac{n\lambda}{2 \sin \theta_2}$$

in which $n$ is the order of the diffraction ($n=1$ for the first order diffraction usually observed) and $\lambda$ is the wavelength of the diffraction X-rays in angstroms which is 1.54 in the case of $CuK_\alpha$ radiation.

The interplanar spacings calculated in this manner are used to determine a crystal perfection index by the equation $$\text{crystal perfection index} = \frac{(d_1/d_2) - 1}{(d'_1/d'_2) - 1} \times 100$$

given by Dismore and Statton in the Journal of Polymer Science, Part C, volume 13, pages 133 to 148 (1966). In this equation $d'_1$ and $d'_2$ are the interplanar spacings for a completely crystalline polyamide. Using the unit cell dimensions of crystalline nylon 66 given by Bunn and Garner in the Proceedings of the Royal Society, volume 189A, pages 39–68 (1947) and the equation for triclinic crystals given by Klug and Alexander on page 36 of the book X-ray Diffraction Procedures, John Wiley and Sons, New York (1954), the interplanar spacing values for nylon 66 are calculated to be $d'_1 = 4.341$ angstroms and $d'_2 = 3.76$ angstroms. Hence, the equation for the crystal perfection index for a nylon 66 membrane is reduced to $$\text{crystal perfection index} = \frac{(d_1/d_2) - 1}{0.181} \times 100$$

In a similar manner, the value of $d'_1$ and $d'_2$ can be calculated for other nylons using the unit cell values given by Miller et al. in the Journal of Polymer Science, volume 55, pages 643 et seq. (1961). Values calculated for the crystal perfection index are sometimes over 100, indicating that the particular samples used for determining unit cell dimensions were not completely crystalline. In any case, a crystal perfection index value above about 90 indicates a high degree of crystallinity.

Unoriented and undrawn polyamide membranes which may be treated in accordance with this invention are characterized by a low degree of crystallinity and thus have relatively low crystal perfection indexes. Typical melt-cast flat films of nylon 6 and nylon 66 have crystal perfection indexes of about zero. The (100) and (010, 110) diffraction rings of the X-ray diffraction pattern are too broad and too close together to be resolved. Typical melt spun slightly drawn hollow fibers of nylon 6 and nylon 66 have crystal perfection indexes below about 80. Polyamide films and hollow fibers with crystal perfection indexes below about 75 are preferred for making the treated membranes used in accordance with this invention.

During the treating process described herein, the crystal perfection indexes of the polyamide membranes increase to at least about 90. Mildly treated membranes with water permeabilities near 50 typically have crystal perfection indexes slightly above about 90. Membranes with sulfate salt rejections near 70% usually have crystal perfection indexes above about 95, and may have values as high as about 110.

(3) Scattering centers.—The treated polyamide membranes used in accordance with this invention are also characterized, when dry, by small angle X-ray diffraction patterns indicating the presence of scattering centers which, when determined by the Dismore small angle soft X-ray method, have extrapolated intercept scattering intensities at zero scattering angle of about 50–220 calculated by the method of Guinier. The preferred membranes, having water permeabilities of at least about 100 and sulfate salt rejections of at least about 70%, have extrapolated intercept scattering intensities of about 70–140. The extrapolated intercept scattering intensity is a function of the number and the electron density of the scattering centers.

The presence of scattering centers is determined by analysis of the intensity gradient of a diffuse halo observed in small angle X-ray diffraction patterns. Because of the general size of the scattering centers present in the treated membranes, the X-ray scattering patterns obtained with the longer wavelength X-rays from an aluminum target are clearer than those obtained with the shorter wavelength X-rays from more conventional sources using copper targets. The longer wavelength X-rays of the aluminum target are scattered over larger angles by the scattering centers and thus can be used to detect the presence of scattering centers having sizes between about 10 Angstroms and several hundred Angstroms.

Figure 8:
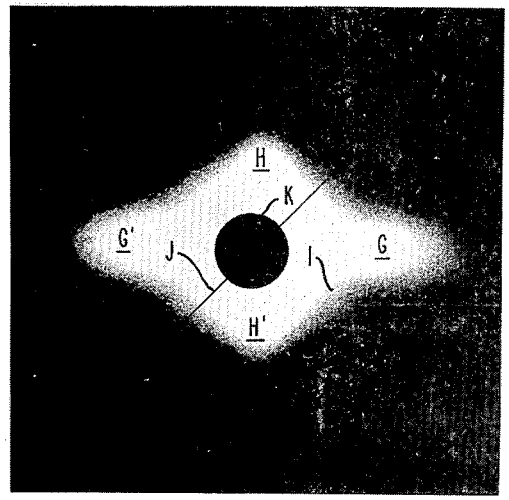
FIG. 8 is a positive print of a small angle X-ray diffraction pattern of the same membrane.

The X-ray diffraction pattern of FIG. 8 is a small angle pattern obtained with X-rays from an aluminum target. The membrane sample was the same group of treated polyamide hollow fibers used to obtain the wide angle diffraction pattern of FIG. 7. Referring now to the diffraction pattern of FIG. 8, protrusions G and G' are meridional diffuse scattering, and protrusions H and H' are equatorial diffuse scattering. The remaining inner circle I is the symmetrical diffuse scattering halo attributed to scattering centers. The intensity of this halo is measured by a densitometer trace along line J at a 45° angle to the equatorial and meridional axes thereby avoiding both equatorial and meridional scattering. Black circle K is a hole in the X-ray film through which the central X-ray beam passes.

The small angle soft X-ray method developed by P. F. Dismore for determining the intercept scattering intensity of the scattering centers in accordance with this invention uses the soft X-ray apparatus developed by H. K. Herglotz which is illustrated in FIGS. 11 and 12. In the description of the Herglotz apparatus, all distances are from surface to surface.

Referring now to FIG. 11, water-cooled aluminum target 61 contains a conical cavity 62 which is 0.035 inch in diameter and 0.060 inch deep. Mounted 0.093 inch beyond target 61 is tantalum shield 63 which is 0.010 inch thick and contains hole 64 which is 0.040 inch in diameter and is centered in line with cavity 62. Wire cathode 65 is made of 3% thoriated tungsten, and is 0.010 inch in diameter and is mounted 0.015 inch beyond shield 63. As can be seen in more detail in FIG. 12, cathode 65 is hairpin shaped with the branches 0.030 inch apart. Tantalum cathode box 66 which is 0.125 inch thick and is mounted 0.25 inch beyond shield 63 containts hole 67 which is 0.030 inch in diameter and is centered in line with cavity 62. Hole 67 is covered and sealed vacuum tight by aluminum foil window 68 which is 0.0002 inch thick and held in place by plate 69 containing first collimator pin-hole 70 which is 0.025 inch in diameter and is centered in line with cavity 62 and holes 64 and 67. This much of the apparatus comprises the X-ray tube which also includes a presure tight enclosure (not illustrated) for maintaining a vacuum within the X-ray tube.

Mounted 0.896 inch beyond cathode box 66 is plate 71 which is 0.62 inch thick and contains second collimator pinhole 72 which is 0.020 inch in diameter and is centered in line with cavity 62 and holes 64, 67 and 70. Mounted 1.988 inches beyond plate 71 is plate 73 which is 0.062 inch thick and contains third pinhole 74 which is 0.030 inch in diameter, is centered in line with cavity 62 and holes 64, 67, 70 and 72 and acts as a scatter guard. Sample 75 is mounted over pinhole 74 on the side of plate 73 away from the X-ray source. X-ray film 76 is mounted 177 millimeters beyond plate 73 perpendicular to a line through the center of collimator pinholes 70, 72 and 74. Film 76 contains hole 77, 0.125 inch in diameter through which the central X-ray beam passes. Hole 77 corresponds to hole K in FIG. 8. The portions of the apparatus from the cathode box 66 to film 76 are the camera which also includes a pressure tight enclosure (not illustrated) for maintaining a vacuum.

In accordance with Dismore method, the X-ray tube is operated with the target powered by a positive 20 kilovolt direct current electrical supply with a ripple of less than 5%. The remainder of tube is grounded. An alternating current at a potential of 2 to 3 volts is used to heat the tungsten filament cathode and is adjusted to give a tube current of 9 milliamperes. The X-ray tube is evacuated to less than $10^{-5}$ torr (mm. Hg at 0° C.) and the camera is evacuated to less than $10^{-3}$ torr.

Sample 75 should have an approximate thickness of about 5–50 microns. For optimum clarity, the film thickness should be about 15 microns. When the sample consists of hollow fibers, the hollow content of the fibers should be taken into consideration in determining the sample thickness. For example, with hollow fibers having an outside diameter of 60 microns and a wall thickness of 15 microns, a single layer of parallel fibers would be suitable. When the configuration of the membrane being evaluated does not lend itself to the sample requirements of the Dismore method, a test sample of suitable dimensions can be prepared from the same polyamide resin as the membrane in question and treated in the same manner. In this case the test sample will provide an accurate measurement of the intercept scattering intensity of the membrane in question.

Film 76 is Ilford Industrial G X-ray film and is exposed for 15 hours. The exposed film is developed for 4.5 minutes at 22° C. in Du Pont "Cronex" X-ray developer. The method by which the developed film is fixed, washed and dried does not affect the scattering center data.

A densitometer trace of the small angle X-ray diffraction pattern negative is made at an angle of 45° to the equatorial axis of the pattern with a Jarrel-Ash microdensitiometer. The degree of resolution of the densitometer is adjusted to give a slit width of 25 microns and a height of one millimeter on the film. The densitometer is adjusted to read 100 transmittance for the background fog of the film and zero transmittance for a completely opaque material. The diffraction pattern is scanned at the rate of one millimeter per minute and recorded at a chart speed of one inch per minute. The complement of the transmittance of the film, which is recorded as the height of the densitometer trace, is proportional to the X-ray intensity for aluminum X-rays. A vertical X-ray intensity scale from 0 to 100 is marked on the densitometer graph over the same range as the 100 to 0 transmittance scale.

The scattering angle scale of the densitometer graph is established as follows: the tangent of the scattering angle which corresponds to one millimeter on the film equals 1 millimeter divided by 177 millimeters, the distance from the sample to the film, or 0.00565. Since the tangent of a small angle is equal to the angle in radians, one millimeter on the film is equal to a scattering angle of 0.00565 radians. Because of the relative scanning and chart speeds set for the densitometer, one millimeter on the film is equal to one inch on the scattering angle scale of the densitometer graph. Thus, one inch on the scattering angle scale is equal to 0.00565 radians. After the densitometer trace is completed, a best vertical line is drawn through the center of the bell-shaped curves and is labelled "zero radians" on the scattering angle scale. The radian scale is then marked off in both directions from this zero point.

Figure 13:
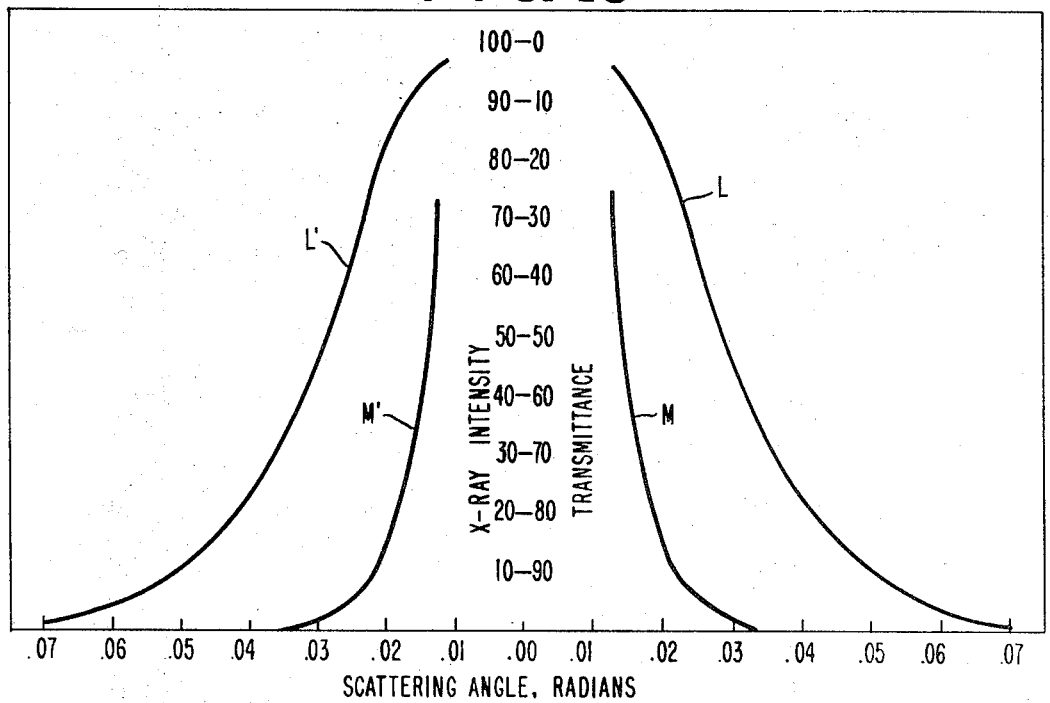
FIG. 13 is a densitometer trace along line J of the negative of the X-ray diffraction pattern of FIG. 8.

FIG. 13 shows typical densitometer traces obtained by scanning small angle X-ray diffraction pattern negatives in which X-ray intensity is plotted against the scattering angle in radians. Curves L and L' are the densitometer trace along line J of the negative of the diffraction pattern of FIG. 8. Curves M and M' are the densitometer trace of the small angle X-ray diffraction pattern negative resulting from the collimating system of the X-ray apparatus without any sample. The X-ray scattering intensity of the treated sample is determined by subtracting the X-ray intensity values of curves M and M' from the values of curves L and L' at the same scattering angles. For example, at a scattering angle of 0.031 radians curve L shows an X-ray intensity of 42.8 and curve M shows an X-ray intensity of 1.25. Thus, the scattering intensity of the sample at this scattering angle is 41.55. In this manner the scattering intensities for the sample are determined at 0.2 inch intervals on the scattering angle scale moving in both directions from zero angle until the sample curve reaches the zero X-ray intensity line.

The theoretical treatment of Guinier, described in X-Ray Diffraction in Crystals, Imperfect Crystals, and Amorphous Bodies, chapter 10.2, "Theory of Small-angle Scattering," pages 322–329, W.H. Freeman & Co., San Francisco (1963), is used to analyze this scattering diagram. According to this treatment the scattering intensity (I) at angle $\epsilon$ is given by the equation:

$$I = KN(p-p_0)^2 V^2 \exp\left[-\frac{4\pi^2 R^2 \epsilon^2}{3\lambda^2}\right]$$

where K is an instrumental constant which is dependent on the intensity of the central X-ray beam, the sensitivy of the apparatus, etc., N is the number of scattering centers, $p$ is the electron density of the scattering centers, $p_0$ is the electron density of the surrounding material, V is the volume of the scattering centers, R is the radius of gyration of the scattering centers, and $\lambda$ is the wavelength of radiation used or 8.34 angstroms.

In accordance with the treatment of Guinier, if the logarithm of the scattering intensity is plotted as a function of the square of the scattering angle in radians, the curve tends to a straight line whose interest scattering intensity at zero scattering angle ($I_0$) is given by the equation: $I_0 = KN(p-p_0)^2 V^2$ and whose slope ($\alpha$) is given by the equation: $\alpha = 4\pi^2 R^2/3\lambda^2 \ln_e 10$.

Figure 14:
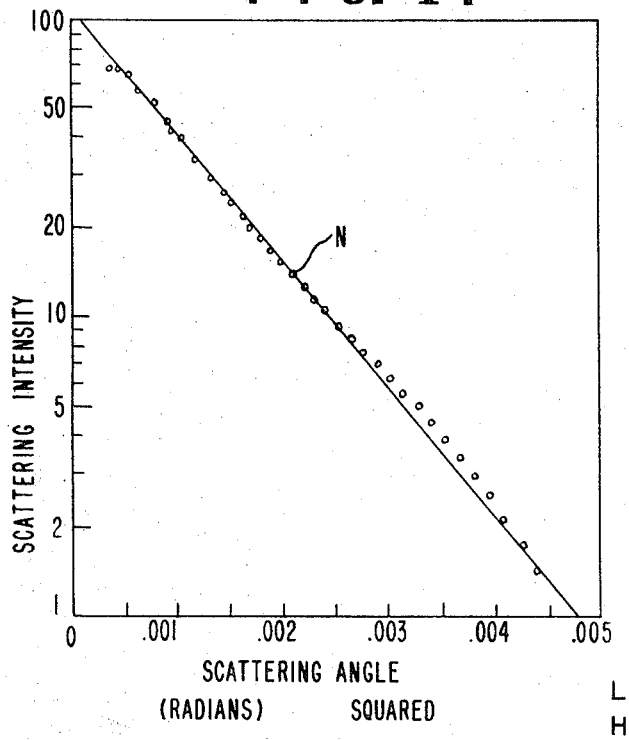
FIG. 14 is a graph of the data obtained from the densitometer trace of FIG. 13.

In FIG. 14 the scattering intensities determined from the curves of Figure 13 are plotted on a logarithmic scale as a function of the square of the scattering angle. A best straight line N is then drawn through the plot of these scattering intensity values. Extrapolation of line N to zero scattering angle gives an extrapolated intercept scattering intensity value of 110.

Guinier has defined the extrapolated intercept scattering intensity by the equation $I_0=KN(p-p_0)^2V^2$. In order to determine the significance of this intercept intensity, it is necessary to determine what happens to the volume (V) of the scattering centers during membrane treatment. The volume will be related to the radius of gyration (R) since they are both functions of the size of the scattering centers.

The radius of gyration (R) can be determined from the slope ($\alpha$) of line N in FIG. 14 using Guinier's equation: $\alpha=4\pi^2R^2/3\lambda^2 \ln_e 10$.
Therefore, $$R=\sqrt{\frac{3\lambda^2\ln_e 10(-\alpha)}{4\pi^2}} \text{ or } 3.469\sqrt{-\alpha}$$

The slope is calculated from the scattering intensity values at two points on line N. For example, at a squared scattering angle of .00096 (0.31 squared) the scattering intensity is 41.55, while at a squared scattering angle of .0025 the scattering intensity is 8.36. Since the scattering intensity is plotted on a logarithmic scale, the slope of the line is given by $$\frac{\log 41.55 - \log 8.36}{.00096 - .0025} = -452$$

The slope has a negative value since the scattering intensity decreases as the scattering angle increases. Thus, the scattering centers of the sample which gave the diffraction pattern of FIG. 8 and the densitometer trace of FIG. 13 has a radius of gyration of $R=3.469\sqrt{-(-452)}=74$ angstroms.

The radius of gyration of the scattering centers has been found to be independent of the severity of the treatment of the membrane. Each membrane seems to have an inherent radius of gyration which results from the particular film casting or blowing or hollow fiber spinning process and which is not changed significantly by the treating process. Since the volume (V) of the scattering centers is a function of the radius of gyration, the volume must also remain substantially constant during the treating process. Thus, the intercept intensity is a function of the number (N) and the electron density (p) of the scattering centers.

Figure 15:
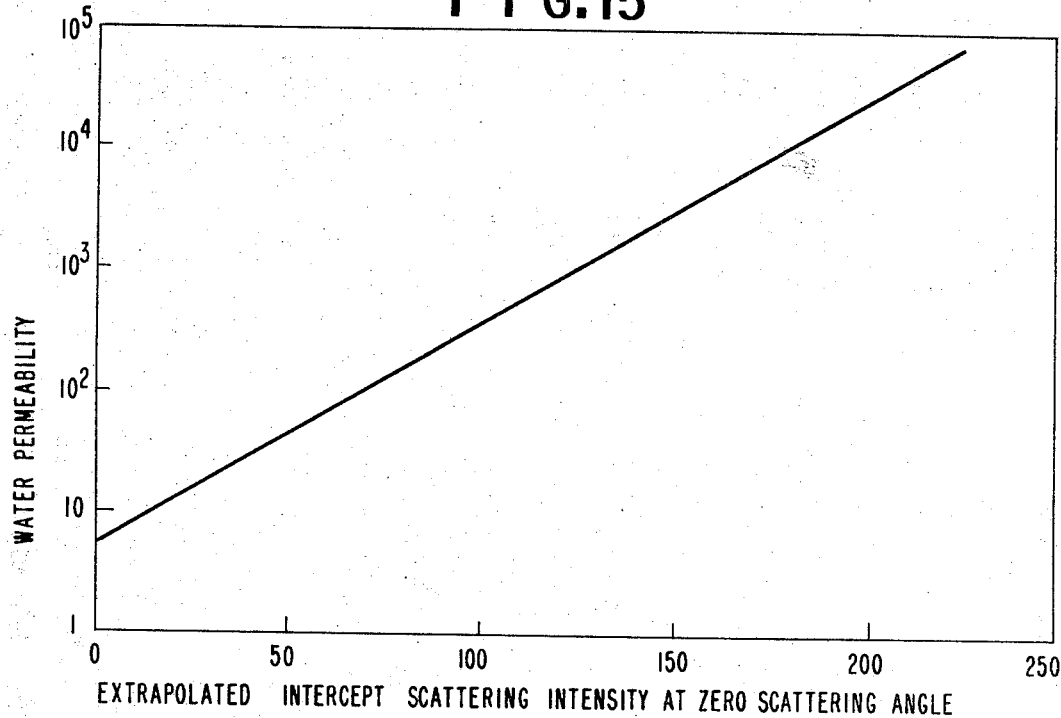
FIG. 15 is a graph which shows the interrelationship between the water permeability and the extrapolated intercept scattering intensity at zero scattering angle of treated membranes.

The extrapolated intercept scattering intensity has been found to increase as a function of the severity of the treatment of the membrane. FIG. 15 shows the relationship between the water permeability and the extrapolated intercept scattering intensity of membranes used in accordance with this invention.

Although it is not intended that this invention be limited to any particular theory as to the nature of these scattering centers, it is believed that they are microvoids formed during the casting, blowing or spinning of the polymer which have a size (indicated by R and V) and number (N) determined by the conditions under which the membrane is formed. The diffuse halo of the small-angle diffraction patern, indicating small randomly distributed X-ray scattering centers, is reasonably attributed to microvoids, as described by Statton in the Journal of Polymer Science, volume 22, pages 385–397 (1956), since irregularly spaced microvoids scatter X-rays in the same manner as polymer crystals or other scattering centers of the same size. This theory is also consistent with the weight loss observed during treatment of the membrane.

It is generally accepted that aliphatic polyamide polymers comprise crystallite portions containing folded, aligned molecular chains and other portions having a lower degree of order, less chain folding and alignment, and slightly lower density. The relative amounts of these portions in a polymer structure depend on the way it is shaped and treated. Since the less ordered portions have substantially the same electron density as the more ordered portions, no diffuse scattering is detected in the small angle X-ray diffraction pattern of untreated membranes.

It is also accepted that the portions of less order are more readily attacked by solvents and other reagents than are the more ordered crystallite portions. Extraction of aliphatic polyamide membranes with treating agents would therefore be expected to remove the more soluble less ordered portions to form microvoids of a size and number determined by the casting, blowing, or spinning conditions used in forming the membrane.

Treating agents of the types involved also promote the formation of crystallites in the more ordered portions of the polymer, as shown by increases in crystallinity detected by wide-angle X-ray scattering techniques. Both extraction of the less ordered portion and crystallization of the more ordered portion increase the electron density difference ($p-p_0$ in the Guinier equation) between these portions, thus making the microvoids detectable by soft X-ray scattering techniques. The increase in the electron density difference depends upon the severity of the treating process. Accordingly, it is believed that the intercept intensity is a measure of the degree of conversion of the less ordered portions formed during shaping of the polymer to microvoids during the treating process.

(6) Reverse osmosis process

The liquid mixtures which are separated by reverse osmosis using the treated membranes taught herein should contain at least about 25% by weight water since water swells the membrane and thereby has a beneficial effect upon its permeation properties. Preferably, the liquid mixture to be separated should contain at least about 50% by weight water.

The treated membranes taught herein may be used to remove a wide variety of materials from aqueous mixtures. Typical components which can be separated from liquid mixtures containing water using the treated membranes taught herein include inorganic salts containing anions such as sulfate, phosphate, fluoride, bromide, chloride, nitrate, chromate, borate, carbonate, bicarbonate and thiosulfate, and cations such as sodium, potassium, magnesium, calcium, ferrous, ferric, manganous and cupric; organic materials such as glucose, phenols, sulfonated aromatics, lignin, alcohols and dyes; and difficultly filterable insoluble materials including viruses and bacteria such as coliform and aerogene. Specific applications for these separations include the purification of saline, brackish and waste waters; recovery of minerals from sea water; water softening, artificial kidney; sterilization; isolation of virus and bacteria; fractionation of blood; and concentration of alkaloids, glucosides, serums, hormones, vitamins, vaccines, amino acids, antiserums, antiseptics, proteins, organometallic compounds, antibiotics, fruit and vegetable juices, sugar solutions, milk, and extracts of coffee and tea, as well as many others. Preferably the treated membranes taught herein are used to purify water containing one or more dissolved inorganic salts, and most preferably sulfate or phosphate salts.

In addition to their use in separating a wide variety of components from water, the treated membranes of this invention may also be used to separate a wide variety of components from each other in aqueous mixtures. These separations involve well-recognized principles of membrane separation technology. Other factors being equal, components of mixtures which are more soluble in non-porous membranes permeate through such membranes more rapidly than other components which are less soluble. Similarly, the components which diffuse at a higher rate will also permeate more rapidly. Many different separations can be obtained because of these differences in solubility and diffusion rates.

The solubilities of various materials in linear aliphatic polyamides depend on a combination of chemical and physical parameters. The chemical parameters include such considerations as acid-base properties, hydrogen-bonding characteristics and metal-chelating tendencies.

Aliphatic polyamides are Lewis bases and therefore are relatively good solvents for Lewis acids such as carboxylic acids and phenols. They are correspondingly poor solvents for Lewis bases such as dialkylamines. The membranes described herein can therefore be used to separate Lewis acids from Lewis bases in their water solutions.

Aliphatic polyamides are chemical derivatives of ammonia and of carboxylic acids and, like such compounds, form covalent bonds with organic hydroxy compounds such as low molecular weight alcohols. The membranes described herein can therefore be used to separate these alcohols from compounds like acetaldehyde and acetone which do not form covalent bonds to the same extent, are less soluble in the polyamide membranes, and permeate through them less easily.

Covalent associations are also formed between aliphatic polyamides and many metal salts. Lyotropic salts which form these associations are more soluble in the membranes described herein than other salts which do not form such associations. As a result, a lyotropic salt such as zinc chloride can be separated from a non-lyotropic salt such as magnesium sulfate in their water solutions. Similarly, lithium chloride passes through these membranes more rapidly than barium chloride in water solutions.

The relative solubilities of other inorganic salts reflect the ionic charges of the ions involved, as indicated by the well-known Born equation. Ions of lower charge density, which is proportional to the quantity of charge and inversely proportional to the radius, are more soluble in polymers and permeate more rapidly through the membranes of this invention, other factors being equal. Consequently, a typical order of rejection of ions by these membranes is $PO_4^\equiv > SO_4^= > Cl^-$. In other words, sodium chloride in water will preferentially permeate through a linear polyamide membrane which gives essentially complete rejection of sodium phosphate.

The solubilities of materials in linear, aliphatic polyamides also depend on their similarity in such properties as cohesive energy density and the related well known solubility parameter of Hildebrand. Since the solubility parameters of aliphatic amides are relatively high, they are better solvents for organic materials with high solubility parameters such as alcohols than for other materials with lower solubility parameters such as ethers and esters. The membranes of this invention therefore preferentially pass alcohols in water solutions containing such mixtures.

The diffusion rates of various materials through linear aliphatic polyamide membranes depend greatly on their relative sizes. Since the effective sizes of organic materials are roughly in the order of their molecular weights, low molecular weight materials diffuse more rapidly than similar higher molecular weight materials. Consequently, formic acid can be separated from acetic and propionic acids and methanol can be separated from ethanol and propanol in their water solutions using the membranes described herein. The effective sizes of inorganic ions depend not only on their atomic weights and ionic charges but also on their degree of hydration.

These solubility and diffusion considerations suggest the use of the membranes described herein to separate a wide variety of components from each other in aqueous mixtures. These include, in addition to those already mentioned, (a) rejection of hardness-causing calcium and magnesium salts from brackish waters without a corresponding rejection of sodium and potassium salts;
(b) rejection of scale-forming carbonate and sulfate salts without a corresponding rejection of chloride salts;
(c) rejection of organic impurities of intermediate and higher molecular weight with permeation of components of lower molecular weight, for instance from oxidation mixtures, fermentation products, waste streams, etc.;
(d) removal of inorganic salts from aqueous mixtures containing dissolved and suspended organic materials, for instance in purifying pharmaceutical preparations, fruit juices, sugar solutions, blood, etc.; and
(e) separation of azeotropes and other close-boiling mixtures.

Other desirable and possible separations will occur to those skilled in the art.

The techniques for carrying out reverse osmosis separation processes are well known to those skilled in the art. The only modification of these techniques which is necessary to the practice of this invention is the use of the improved membranes taught herein in place of a conventional membrane. The feed fluid containing at least one dissolved constituent is passed under pressure in contact with one side of the membrane. Purified fluid is then removed from the other side of the membrane. The apparatus illustrated in FIGS. 1 and 2 may be used. Preferably the membrane is in the form of hollow fibers and an apparatus similar to that illustrated in FIG. 2 is used. In general, the difference in hydraulic pressure between the two sides of the membrane may be 50–2000 p.s.i. and preferably is 100–1500 p.s.i.

(7) Examples

The following examples, illustrating the improved membranes used in accordance with this invention and the method of their production, are given without any intention that the invention be limited thereto. All percentages are by weight.

EXAMPLE 1

Hollow fibers were prepared from "Zytel" 43 nylon 66 resin having a relative viscosity in the range of 45–53 as defined by Spanagel in U.S. Pat. 2,385,890. The spinning equipment comprised a screw melter and a 17-hole sheath-core spinneret of the type shown by Breen et al. in U.S. Pat. 2,999,296. Each hole in the spinneret had a plate hole diameter of 40 mils, an insert of 32 mils diameter, a slot width of 4 mils, and a center hole for gas inlet of about 17 mils diameter. The melter barrel was operated at about 283° C. and the spin block at about 277–285° C. Sand pack pressure was in the range of 2400–3000 p.s.i.g. with a feed rate of 1.5 grams per minute per hole. The fibers leaving the spinneret were air-quenched without drawing and wound up at a rate of about 1000 yards per minute.

A bundle of 4752 hollow filaments having an outside diameter of 53 microns and inside diameter of 27 microns was assembled by winding a collection of continuous filaments around two supports 65 inches apart. The bundle was enclosed in a loose-fitting net sleeve woven from a polyester fiber and the last 10 inches at each end were protected by wrapping with polyethylene film. The enclosed and protected bundle was placed in about 500 ml. of a circulated treating composition inside a closed vessel, with the protected ends supported above the surface of the mixture. Aqueous formic acid solutions of various concentrations were used as the treating composition at a variety of treating temperatures as indicated in Table IV. The bundle was removed from the treating composition after about four hours, drained of excess liquid, and placed in about 750 ml. of room temperature deionized wash water. After about 15 minutes with occasional agitation, the bundle was removed from the wash water and drained, the protecting wrappings were removed from the ends and the whole bundle was immersed in 1500 ml. of deionized water at room temperature. The bundle was repeatedly washed in a similar manner for a total of eight 15-minute washes. The ends of the bundle were air dried while keeping the treated portion wet with water. The treated portion of the bundle at this point was 36 inches long.

The bundle was installed in an apparatus of the type shown in FIG. 4 using the permeation cell of FIG. 2. During assembly the fiber ends of the bundle were cut to open the hollow fibers to fluid flow. One permeate exit of the permeation cell was closed with a pressure gauge so that all permeate was withdrawn from the other exit. The permeation tests were carried out using a brackish water containing 1500 p.p.m. dissolved mixed sulfate salts at a feed pressure of 600 p.s.i.g. The pressure gauge at the permeate exit measured a pressure of 100 p.s.i.g. which indicated an average permeate pressure of 50 p.s.i.g. Accordingly, a difference in hydraulic pressure of 550 p.s.i. was used in calculating the water permeability. The sulfate concentration of the permeate was measured conductimetrically. The conductivities of the solutions were converted to salt concentrations by means of calibration curves derived from solutions of known concentration.

For comparison, a similar run was made using untreated hollow fibers as a control. The results obtained are given in Table IV. These data were used to plot the graphs of FIG. 16.

TABLE IV

| Membrane: | Treating conditions | | Water permeability | Sulfate salt rejection, percent |
|---|---|---|---|---|
| | Formic acid concentration, percent | Temp., °C. | | |
| Control | | | 5 | 99.7 |
| 1 | 30.0 | 25 | 21 | 99.7 |
| 2 | 50.0 | 25 | 37 | 97.3 |
| 3 | 60.1 | 25 | 80 | 98.6 |
| 4 | 62.5 | 25 | 113 | 97.0 |
| 5 | 65.0 | 25 | 226 | 95.6 |
| 6 | 67.5 | 25 | 750 | 76.0 |
| 7 | 54.8 | 50 | 84 | 99.0 |
| 8 | 57.5 | 50 | 188 | 96.4 |
| 9 | 60.1 | 50 | 433 | 91 |
| 10 | 30.0 | 75 | 43 | 90.5 |
| 11 | 50.0 | 75 | 159 | 88 |
| 12 | 54.8 | 75 | 1,250 | 31 |
| 13 | 57.5 | 75 | 2,880 | 4 |

The orientation angles of the control membrane and of treated membranes 2 and 6 were determined by wide angle X-ray diffraction using $CuK_\alpha$ radiation. A General Electric Ca-7 X-ray tube with a copper target, operating at 40 kilovolts and 20 milliamperes tube current was used with a camera of the type shown on page 233 of Newer Methods of Polymer Characterization, edited by Ke, Interscience Publishers, New York (1964). An essentially single-layered sample of parallel fibers was aligned perpendicular to the X-ray beam, which was filtered through nickel foils to attenuate the $K_\beta$ radiation and collimated through 25 mil pinholes 3 inches apart. Eastman Kodak Type AA X-ray film was mounted 5.0 centimeters from the sample. Three hour exposures were required for suitable photographs.

An azimuthal scan was made with a Joyce microdensitometer through the inner (100) and outer (010, 110) diffraction arcs. The scans were then resolved into overlapping Gaussian peaks with the Du Pont Model 310 curve resolver. The average arc lengths in degrees at the half-maximum intensity of the inner (100) and the resolved outer (010, 110) diffraction arcs were determined.

Crystal perfection index values for these same samples were determined from the same X-ray diffraction patterns used to determine orientation angles. The radial densitometer traces made with a Joyce micro-densitometer had two peaks on either side of the central beam stop. The distances between the centers of these peaks and the center of the diagram were converted to the diffraction angles of the inner and outer spots from the geometry of the camera and densitometer systems. Crystal perfection indexes were then calculated using Bragg's law and the formula:

$$\frac{(d_1/d_2-1)}{0.181} \times 100$$

The Dismore small angle soft X-ray method was used to obtain X-ray diffraction patterns for these same samples. The extrapolated intercept scattering intensity at zero scattering angle was calculated according to the method of Guinier.

The following X-ray diffraction characterization results were obtained:

TABLE V

| | Membrane | | |
|---|---|---|---|
| | Control | 2 | 6 |
| Orientation, orientation angle, degrees: | | | |
| (100) diffraction arcs | 43 | 45 | 31 |
| (010, 110) diffraction arcs | 68 | 49 | 43 |
| Crystallinity, Bragg Diffraction angle, degrees: | | | |
| (100) diffraction arcs | 20.4 | 20.0 | 20.3 |
| (010, 110) diffraction arcs | 23.2 | 23.4 | 24.2 |
| Interplanar spacing: | | | |
| $d_1$ | 4.35 | 4.44 | 4.37 |
| $d_2$ | 3.83 | 3.97 | 3.67 |
| Crystal Perfection Index | 75 | 95 | 105 |
| Scattering centers: | | | |
| Slope | | −487 | −452 |
| Radius of gyration, angstroms | | 77 | 74 |
| Extrapolated intercept intensity | | 37 | 110 |

These results show a decrease in orientation angle, an increase in crystal perfection index, and an increase in intercept intensity with more severe treatment.

EXAMPLE 2

Hollow fibers were prepared from "Plaskon" type 201 nylon 6, and extracted grade obtained from the Allied Chemical Company. The spinning equipment comprised a screw melter and a 5-hole sheath-core spinneret of the type described by Breen et al. in U.S. Pat. 2,999,296. Each hole of the spinneret had a plate hole diameter of 40 mils, an insert of 32 mils diameter, slot width of 4 mils, and a center hole of 20 mils diameter. The melter barrel was operated at 300° C. and the spinneret block at 250° C. Sand pack pressure was 3800–4100 p.s.i.g. at a feed rate of 0.60 gram per minute per hole. The fibers were air quenched and wound up at a rate of about 400 yards per minute. They had an average outside diameter of 52.8 microns and an inside diameter of 29.0 microns.

A bundle of 4,990 hollow filaments was assembled, treated with 52% aqueous formic acid for 4 hours, and rinsed free of formic acid as described in Example 1. The treated portion of the bundle was 35.5 inches long. The treated bundle was assembled into a permeation cell of the type shown in FIG. 2 and the cell was installed in an apparatus of the type shown in FIG. 4 for tests with a synthetic brackish water containing 1500 p.p.m. mixed sulfate salts as described in Example 1. With a feed pressure of 600 p.s.i.g., a pressure gauge at one exit of the cell measured a pressure of 90 p.s.i.g., indicating an average difference in hydraulic pressure of 555 p.s.i. The treated nylon 6 hollow filaments had a water permeability of 300 and a sulfate salt rejection of 93% with 34% of the feed water permeating through the membrane.

EXAMPLE 3

A flat film of "Zytel" 43 nylon 66 resin of nominal 1 mil thickness was prepared by slitting a blown tube made by the technique described by Dyer et al. in U.S. Pat. 2,966,700 using the tubing extrusion apparatus illustrated in FIG. 5 of that patent. The resin was extruded at 505° F. through a die 9 inches in diameter with an annular gap of 20 mils. The resulting tube was passed around a 12 inch diameter shaped cooler containing oil which was introduced into the bottom at 145° F. and removed from the top at 198° F. Air was passed into the space between the extrusion die and the shaped cooler at rate and pressure sufficient to expand the tube and to cushion its passage around the cooler, and air was bled from the space above the cooler at a pressure which prevented collapse of the tube. The tube was passed through a conventional air ring near the top of the cooler for cooling of the outside surface of the tube. Both the air ring and the die were oscillated for better film gauge uniformity. With a production rate of 100 feet per minute, the resulting tube had a wall thickness ranging between 0.70 and 1.25 mils and averaging 0.95 mil. Duplicate samples had crystal perfection index values of 21 and 31, determined from wide-angle X-ray diffraction patterns. Both the inner and outer rings of the patterns were large, indicating very little orientation of the polymer in the film.

A 4.50 inch x 10.25 inch piece of film was dried to constant weight at 25° C. and 1 mm. Hg and attached to a cylindrical 4-mesh stainless steel screen with cotton string tied 0.20 inch from each film edge. Screen and film were soaked in 500 ml. of 56.4% aqueous formic acid soltuion at 25° C. for 20 hours. The film was then rinsed in two liters of deionized water at 25° C. The water was changed every 15 minutes for a total of six rinses after which the wash water had the same conductivity as fresh deionized water. The film was then dried to constant weight at 25° and 1 mm. Hg and reweighed to give a weight loss of 2.5% due to the acid treatment.

A film for permeation measurements was prepared in the same way except that the final drying was omitted. The film was installed in the permeation cell of FIG. 1 for tests with a synthetic brackish water containing 1500 p.p.m. dissolved mixed sulfate salts. The salt concentration in the permeate was determined by adding a standard barium chloride solution and measuring the amount of barium sulfate fromed turbidometrically. The membrane had a water permeablity of 220 and a salt rejection of 96.6%.

EXAMPLE 4

Two pieces of film, 4 inches by 4 inches, were cut from the film prepared in Example 3. They were weighed and then soaked for 2 hours at 25° C. in approximately 150 ml. of a solution of 61.8% formic acid in water. They were then given eight 15-minute rinses in fresh 500 ml. portions of water. One film was air dried for 20 hours after which it showed a weight loss of 4.0%. The other film was stored in water until mounted in the permeation cell of FIG. 1 and gave a water permeability of 507 and a sulfate salt rejection of 83% in tests at a feed pressure of 500 p.s.i.g. using a synthetic brackish salt solution containing 1500 p.p.m. mixed sulfate salts.

EXAMPLE 5

Flat films of "Zytel" 43 nylon 66 resin, 1 mil thick, were made by extruding the molten polymer at a temperature of 288–296° C. through a slit die at a rate of 100–150 linear feet per minute onto a polished quench roll with an air gap of 4–7 inches between the die and the quench roll. Two samples of the resulting films had crystal perfection indexes of 61 and 63 as determined from wide angle X-ray diffraction patterns. The inner and outer axes of the X-ray diffraction patterns were large in size, indicating large orientation angles.

Two pieces of film, 6.75 inches by 12.75 inches, were weighed and soaked in 2–3 liters of a treating composition containing 80% acetic acid and 20% water for 20 minutes at 50° C. The solution was mechanically stirred during this treatment. The films were then rinsed for 30 minutes in 1.5 liters of water at room temperature. One film was air dried and weighed to give a weight loss of 2.3%. The other film was stored in water until mounted in the permeation cell of FIG. 1 for testing permeation properties at a feed pressure of 500 p.s.i.g. with a synthetic brackish salt solution containing 1500 p.p.m. mixed sulfate salts. The salt concentration in the permeate was determined conductimetrically. The sample had a water permeability of 458 and a sulfate salt rejection of 91%.

EXAMPLE 6

A flat film of "Zytel" 42 nylon 66 resin was prepared in the manner described in Example 5 except that the extrusion temperature was 302–310° C. Pieces of the film were treated and tested as described in Example 5 using a 20% aqueous acetic acid treating solution. The data in Table VI was obtained.

TABLE VI

| Treating temperature, ° C. | Weight loss, percent | Water permeability | Sulfate salt rejection percent |
| --- | --- | --- | --- |
| 50 | 2.3 | 458 | 91 |
| 60 | 3.4 | 888 | 79 |

EXAMPLE 7

This example illustrates the effectiveness of a wide variety of protonic acids as treating agents. The procedure used and the results obtained are set forth in Table VII. For convenience the experiments are arranged in increasing order of pKa of the protonic acids. When NaOH and water was used as the rinse medium the film received two 15-minute water rinses, two rinses in 2% aqueous sodium hydroxide, and two more rinses in water.

TABLE VII

| Film preparation, Example No. | Treating procedure, Example No. | Treating composition | | Treating conditions | | | Results | | |
| --- | --- | --- | --- | --- | --- | --- | --- | --- | --- |
| | | Treating agent, weight percent | Solvent | Time | Temp., ° C. | Rinse medium | Weight loss, percent | Water permeability | Sulfate salt rejection, percent |
| 3 | 3 | 11.7% hydrochloric acid | Water | 23 hours | 25 | Water | | 160 | 98 |
| 3 | 3 | 16.3% trichloroacetic acid | do | 21 hours | | do | 2.0 | 170 | 98 |
| 3 | 4 | 3.8% chloroacetic acid | Chloroform | 1 hour | | do | | 1,100 | 53 |
| 3 | 4 | 49.5% phosphorl acid | Water | 5 minutes | 25 | do | 1.7 | 245 | 94 |
| 5 | 3 | 56.34% formic acid | do | 20 hours | 25 | do | 3.8 | 250 | 95 |
| 3 | 4 | 61.8% formic acid | do | 2 hours | 25 | NaOH, water | 5.3 | 508 | 79 |
| 3 | 3 | 65.5% formic acid | do | 20 hours | 25 | Water | 7.5 | 12,600 | 28 |
| 3 | 4 | 67.8% formic acid | do | 2 hours | 25 | do | 13.6 | 19,500 | 10 |
| 3 | 4 | 2.45% formic acid | Chloroform | 1 hour | 25 | do | 2.8 | 1,050 | 55 |
| 3 | 4 | 3.94% formic acid | do | 5 seconds | 25 | do | 2.1 | | |
| 3 | 4 | do | do | 15 seconds | 25 | do | 2.3 | | |
| 3 | 4 | do | do | 30 seconds | 25 | do | 2.6 | | |
| 3 | 4 | do | do | 60 seconds | 25 | do | 2.6 | | |
| 3 | 4 | do | do | 90 seconds | 25 | do | 2.9 | | |
| 3 | 4 | do | do | 120 seconds | 25 | do | (¹) | | |
| 3 | 4 | 100% acetic acid | None | 1 hour | 25 | do | 1.8 | 50 | 99+ |
| 3 | 4 | 51% o-chlorophenol | Ethanol | do | 25 | Ethanol | 1.9 | | |
| 3 | 4 | 51% phenol | Pyridine | do | 80 | Water | 1.6 | 16 | 97.6 |
| 3 | 4 | 4.5% phenol | Water | do | 70 | NaOH, water | 1.2 | 285 | 83 |
| 3 | 4 | 53.3% chloral hydrate | do | do | 25 | Water | 2.8 | 470 | 85 |

¹ Disintegrated.

EXAMPLE 8

This example illustrates the effectiveness of a wide variety of lyotropic salts as treating agents. The procedures used and the results obtained are set forth in Table VIII. For convenience, the salts are arranged in the order in which their cations appear in Table II. The rinse medium in all the experiments was water.

salt rejection. Commercial films prepared from "Capran" 77C nylon 6 were treated and tested in accordance with the procedure of Example 3 using aqueous formic acid solutions of various concentrations at 25° C. and a treating time of 20 hours to obtain the results shown in Table X. When plotted in FIG. 5, these relationships follow the sulfate ion ($SO_4^=$) curve.

TABLE VIII

| Film preparation, Example No. | Treating procedure, Example No. | Treating composition, weight percent | | Treating conditions | | Results | | |
|---|---|---|---|---|---|---|---|---|
| | | Treating agent | Solvent | Time | Temp., °C. | Weight loss, percent | Water permeability | Sulfate salt rejection, percent |
| 3 | 4 | 17.5% KSCN | 82.5% methanol | 1 hour | 65 | 1.2 | | |
| 3 | 4 | 20% FeCl₃ | 80% methanol | do | 25 | 2.3 | | |
| 6 | 5 | 16.7% CaCl₂ | 55.5% methanol, 27.8% water | 20 minutes | 70 | 3.1 | 300 | 96 |
| 5 | 5 | 17.6% CaCl₂ | 58.8% methanol, 23.6% water | do | 30 | 1.6 | 19 | 95 |
| 5 | 5 | 17.6% CaCl₂ | do | do | 40 | 3.2 | 252 | 94 |
| 5 | 5 | 17.6% CaCl₂ | do | do | 45 | 2.8 | 186 | 96 |
| 5 | 5 | 17.6% CaCl₂ | do | do | 50 | 3.8 | 356 | 96 |
| 5 | 5 | 17.6% CaCl₂ | do | do | 55 | 6.6 | 1,296 | 76 |
| 5 | 5 | 17.6% CaCl₂ | do | do | 60 | 10.4 | 2,460 | 62 |
| 6 | 5 | 17.6% CaCl₂ | 58.9% N,N-dimethylacetamide, 23.5% water | 1 hour | 100 | 1.5 | 35 | 97 |
| 6 | 5 | 18.85% CaCl₂ | 62.5% methanol, 18.85% water | 20 minutes | 60 | 12.9 | 8,080 | 42 |
| 5 | 5 | 18.85% CaCl₂ | do | do | 50 | 33.1 | 25,000 | 16 |
| 6 | 5 | 44.5% ZnBr₂ | 55.5% water | do | 90 | 1.2 | 56 | 98 |
| 3 | 3 | 23.8% ZnCl₂ | 76.2% methanol | 1 hour | 25 | | 62 | 98.5 |
| 3 | 4 | 24.5% Zn(NO₃)₂·6H₂O | 75.5% methanol | do | 65 | 1.2 | | |
| 3 | 3 | 38.5% CoCl₂ | 61.5% methanol | 2 hours | 60 | 4.7 | | |
| 3 | 4 | 24.5% Co(NO₃)₂·6H₂O | 75.5% methanol | 1 hour | 65 | 1.2 | | |
| 3 | 4 | 21.7% MnCl₂ | 78.3% methanol | do | 65 | 3.0 | 0 | 0 |
| 3 | 4 | 24.5% MnBr₂·4H₂O | 75.5% methanol | do | 65 | 2.0 | | |

EXAMPLE 9

This example shows that an aqueous phenol solution modifies a nylon film more extensively at a lower temperature (25° C.) than at a higher temperature (70° C.). The procedures of Example 4 were followed using aqueous phenol as the treating agent and treating times of one hour. The data in Table IX were obtained.

TABLE IX

| | Treating temperature, °C. | Water Permeability | Sulfate salt rejection, percent |
|---|---|---|---|
| Phenol, percent: | | | |
| 4.46 | 70 | 400 | 91 |
| 4.46 | 25 | 520 | 83 |
| 5.66 | 70 | (¹) | (¹) |
| 5.66 | 25 | (²) | (²) |

¹ Film remained intact.
² Film disintegrated.

EXAMPLE 10

This example illustrates the effectiveness of a Lewis acid as the treating agent. The procedure of Example 4 was followed using a solution containing 8.1% boron trifluoride in methanol as treating agent for five minutes at 25° C. The resulting films had a weight loss of 2.9%, a water permeability of 130, and a sulfate salt rejection of 96.4%.

TABLE X

| | Formic Acid strength, percent | Water permeability | Sulfate salt rejection, percent |
|---|---|---|---|
| Film thickness, microns: | | | |
| 13 | 46.0 | 330 | 94 |
| 13 | 51.0 | 980 | 82 |
| 25 | 46.0 | 90 | 94 |
| 25 | 51.0 | 360 | 86 |
| 25 | 54.4 | 660 | 73 |
| 25 | 56.8 | 1,300 | 70 |
| 51 | 46.6 | 74 | 98 |
| 51 | 51.4 | 95 | 95 |
| 51 | 56.4 | 450 | 72 |

EXAMPLE 12

This example shows the separation of inorganic salts during reverse osmosis purification of brackish waters with a treated membrane of this invention. "Zytel" 43 nylon 66 hollow fibers were prepared, treated and assembled in the manner of Example 1 into a permeation cell of the type shown in FIG. 2. This cell contained 3456 hollow fibers treated for a length of 32 inches with 60.5% formic acid for four hours at 50° C. The cell was used in the reverse osmosis purification of natural brackish waters from several locations within the United States, with the results shown in Table XI. The tests were run with a feed pressure of 600 p.s.i.g. and a dead-end pressure of 50 p.s.i.g. at one end of the cell, for an effective reverse osmosis pressure of 575 p.s.i.

TABLE XI

| Natural water | Italy, Texas | | Kingsville, Texas | | Pringhar, Iowa | | Redfield, S. Dak. | | Tularosa, N. Mex. | |
|---|---|---|---|---|---|---|---|---|---|---|
| | Initial value | Reduction, percent | Initial value | Reduction, percent | Initial value | Reduction, percent | Initial value | Reduction, percent | Initial value | Reduction, percent |
| Ion Conc., p.p.m.: | | | | | | | | | | |
| Sodium | 645 | 69 | 575 | 66 | 123 | 60 | 730 | 77 | 55 | 44 |
| Potassium | 0.85 | 59 | 16 | 25 | 4 | 50 | 6.5 | 84 | 2.4 | 75 |
| Calcium | 2.7 | 44 | 71 | 82 | 250 | 92 | 36 | 58 | 281 | 88 |
| Magnesium | 0.9 | 89 | 17 | 88 | 83 | 93 | 7.8 | 94 | 75 | 89 |
| Bicarbonate | 523 | 45 | 169 | 51 | 179 | 16 | 196 | 53 | 128 | 55 |
| Chloride | 100 | 0 | 400 | 17 | 22 | 23 | 200 | 5 | 82 | 27 |
| Sulfate | 460 | 98 | 720 | 98 | 1,010 | 97 | 1,050 | 98 | 745 | 97 |
| Total dissolved solids, p.p.m. | 1,500 | 60 | 1,900 | 64 | 1,980 | 85 | 2,200 | 78 | 1,600 | 85 |
| Hardness, calc. from Ca, Mg concen | 10 | 60 | 249 | 83 | 1,347 | 94 | 123 | 67 | 1,012 | 89 |
| Permeate, percent of feed | 53 | | 50 | | 53 | | 58 | | 46 | |
| Water permeability | 235 | | 212 | | 216 | | 265 | | 216 | |

EXAMPLE 11

This example demonstrates that films of different original thicknesses yield membranes with substantially the same relationship between water permeability and sulfate

EXAMPLE 13

This example shows that membranes prepared as taught herein can remove phosphate ions from brackish waters even more effectively than sulfate ions. A flat film was prepared and treated by the procedure of Example 3 using 66.1% aqueous formic acid as the treating solution. The treating time was 1 hour and seven 15-minute water rinses were used. The film was tested for permeation properties using a solution containing trisodium phosphate equivalent to about 100 p.p.m. of phosphate ion ($PO_4^=$) as the feed. The water permeability was 11,000 and the phosphate salt rejection was 96.6%. By comparison, the sulfate salt rejection of a similar film was 32.5%.

Although the invention has been described and exemplified by way of specific embodiments, it is not intended that it be limited thereto.

The embodiments of the invention in which an exclusive property or privilege is claimed are defined as follows:

1. A process for the reverse osmosis separation of a liquid mixture containing at least 25% by weight water which comprises
    (A) passing said mixture in contact with one surface of a substantially linear, aliphatic polyamide resin membrane which is in the form of a hollow fiber having an outside diameter of 10–250 microns, a wall thickness of 2–75 microns, and a ratio of the cross-sectional area of the internal bore of the fiber of the total cross-sectional area within the outer perimeter of the fiber of 0.12–0.60, which membrane is characterized, when dry, by
        (1) a crystal perfection index, determined from its wide angle X-ray diffraction pattern, of at least 90,
        (2) a wide angle X-ray diffraction pattern in which the (100) diffraction arcs are centered on the equator and have an orientation angle of less than 50° and in which the (010, 110) diffraction arcs are centered about the equator, are separated by a maximum of 45° and have an orientation angle of less than 55°, and
        (3) a small angle X-ray diffraction pattern having an intercept scattering intensity of 50–220 at zero scattering angle when determined by the Dismore small angle soft X-ray method, and is characterized, when wet, by a water permeability of 50–50,000, and
    (B) recovering from the other side of the membrane a liquid mixture which has passed through the membrane and which contains a reduced amount of one component of the mixture.

2. The process of claim 1 wherein the liquid mixture is water containing a dissolved inorganic salt and the recovered liquid mixture is water containing a reduced amount of the inorganic salt.

3. The process of claim 2 wherein the inorganic salt is selected from the group consisting of sulfate and phosphate salts, the membrane has a sulfate salt rejection of at least 70%, the outside diameter is 15–150 microns, the wall thickness is 5–40 microns, the ratio of the area of the internal bore to the total area is 0.18–0.45, the scattering centers have an intercept scattering intensity of 70–140, and the water permeability is at least 100.

4. A reverse osmosis membrane in the form of a hollow fiber having an outside diameter of 10–250 microns, a wall thickness of 2–75 microns, and a ratio of the cross-sectional area of the internal bore of the fiber to the total cross-sectional area within the outer perimeter of the fiber of 0.12–0.60, which membrane comprises a substantially linear, aliphatic polyamide resin and is characterized, when dry, by
    (1) a crystal perfection index, determined from its wide angle X-ray diffraction pattern, of at least 90,
    (2) a wide angle X-ray diffraction pattern in which the (100) diffraction arcs are centered on the equator and have an orientation angle of less than 50°, and in which the (010, 110) diffraction arcs are centered about the equator, are separated by a maximum of 45° and have an orientation angle of less than 55°, and
    (3) a small angle X-ray diffraction pattern having an intercept scattering intensity of 50–220 at zero scattering angle when determined by the Dismore small angle soft X-ray method,
and is characterized, when wet, by a water permeability of 50–50,000.

5. The hollow fiber membrane of claim 4 in which the outside diameter is 15–150 microns, the wall thickness is 5–40 microns, the ratio of the area of the internal bore to the total area is 0.18–0.45, the scattering centers have an intercept scattering intensity of 70–140, the water permeability is at least 100, and the membrane has a sulfate salt rejection of at least 70%.

6. A process for preparing a reverse osmosis hollow fiber membrane which comprises
    (A) treating a substantially linear, aliphatic polyamide resin, hollow fiber membrane having an outside diameter of 10–250 microns, a wall thickness of 2–75 microns, and a ratio of the cross-sectional area of the internal bore of the fiber to the total cross-sectional area within the outer perimeter of the fiber of 0.12–0.60 with a liquid treating composition containing, by weight,
        (1) 1–100% of a treating agent selected from the group consisting of
            (a) protonic acids having pKa in water not greater than 10.3 and a pH not in excess of 6.3 for a 0.01 molar aqueous solution at 25° C.,
            (b) lyotropic salts containing a cation and an anion listed in Table II in which the anion is higher in the list than the cation, and
            (c) Lewis acids selected from the group consisting of aluminum halides of the formula $AlX_3$ is which X is chlorine or bromine, and boron halides of the formula $BX'_3$ in which X' is fluorine, chlorine, or bromine and
        (2) 0–99% of a solvent for said treating agent which is essentially chemically inert toward said treating agent and said membrane and is essentially a nonsolvent for said membrane
    at a temperature at least high enough to maintain said composition as a single liquid phase but not in excess of the boiling point of said composition for at least one second, said conditions of temperature, time, concentration of treating agent, and choice of solvent being such that, when said membrane is dried to constant weight, treated under said conditions, rinsed to remove said treating agent and redried to constant weight, a weight loss of 1–35% is obtained, and
    (B) rinsing said membrane to remove said treating agent with a rinse medium which contains at least 25% by weight water, is a solvent for said treating agent, and is essentially inert toward said membrane under the rinse conditions.

7. The process of claim 6 in which the treated and rinsed membrane is left wet with a medium which contains at least 25% by weight water and is essentially inert toward said membrane.

8. The process of claim 6 in which the treating agent is selected from the group consisting of aliphatic carboxylic acids of one to three carbon atoms, benzoic acid, and the chlorine substituted derivatives thereof; inorganic acids having a pKa below 2.5; phenol; o-cresol; potassium, sodium, and ammonium thiocyanates; calcium, lithium, magnesium and ferric thiocyanates, bromides, and chlorides; zinc, cobaltous, and manganous thiocyanates, bromides, chlorides, and nitrates; boron trifluoride; and aluminum chloride.

9. The process of claim 6 in which the polyamide resin is a copolymer of adipic acid and hexamethylene diamine, the treating composition is a 45–70% by weight solution of formic acid in water, and the membrane is treated at a temperature of 25–75° C. for a time ranging from a few minutes to a few hours.

10. The process of claim 6 in which the polyamide resin is a copolymer of adipic acid and hexamethylene diamine and the treating composition is a solution of calcium chloride in aqueous methanol.

11. The process of claim 6 in which the polyamide resin is a copolymer of adipic acid and hexamethylene diamine and the treating composition is a solution of zinc chloride in aqueous methanol.

12. A process for preparing a reverse osmosis membrane which comprises
(A) treating a substantially linear, aliphatic polyamide resin membrane 2–75 microns thick with a liquid treating composition containing, by weight,
   (1) 1–35% of a Lewis acid selected from the group consisting of aluminum halides of the formula $AlX_3$ in which X is chlorine or bromine, and boron halides of the formula $BX'_3$ in which $X_2$ is fluorine, chlorine, or bromine and
   (2) 65–99% of a solvent for said treating agent which is essentially chemically inert toward said treating agent and said membrane and is essentially a non-solvent for said membrane
at a temperature at least high enough to maintain said composition as a single liquid phase but not in excess of the boiling point of said composition for at least one second, said conditions of temperature, time, concentration of Lewis acid, and choice of solvent being such that, when said membrane is dried to constant weight, treated under said conditions, rinsed to remove said Lewis acid and redried to constant weight, a weight loss of 1–35% is obtained, and
(B) rinsing said membrane to remove said Lewis acid with a rinse medium which contains at least 25% by weight water and is essentially inert toward said membrane under the rinse conditions.

13. The process of claim 12 in which the treated and rinsed membrane is left wet with a medium which contains at least 25% by weight water and is essentially inert toward said membrane.

14. The process of claim 12 in which the polyamide resin is a copolymer of adipic acid and hexamethylene diamine and the treating composition is a solution of boron trifluoride in methanol having a boron trifluoride concentration below its maximum solubility in methanol.

References Cited

UNITED STATES PATENTS

| | | |
|---|---|---|
| 2,889,611 | 6/1959 | Bedell. |
| 2,904,840 | 9/1959 | Hochreuter. |
| 3,012,905 | 12/1961 | Tillisch. |
| 3,060,550 | 10/1962 | Smith. |
| 3,423,491 | 1/1969 | McLain et al. |

FOREIGN PATENTS 654,215    3/1966    Republic of South Africa.

FRANK A. SPEAR, Jr., Primary Examiner

U.S. Cl. X.R.

210—321, 500; 264—41, 216, 340